(12) United States Patent
Peng

(10) Patent No.: US 12,256,245 B2
(45) Date of Patent: Mar. 18, 2025

(54) LINK FAULT COMMUNICATION METHODS AND APPARATUSES

(71) Applicant: Huawei Technologies Co., Ltd., Shenzhen (CN)

(72) Inventor: Wenjie Peng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 324 days.

(21) Appl. No.: 17/809,639

(22) Filed: Jun. 29, 2022

(65) Prior Publication Data

US 2022/0330056 A1   Oct. 13, 2022

Related U.S. Application Data

(63) Continuation of application No. PCT/CN2019/130984, filed on Dec. 31, 2019.

(51) Int. Cl.
*H04W 24/04* (2009.01)
*H04W 76/30* (2018.01)

(52) U.S. Cl.
CPC .......... *H04W 24/04* (2013.01); *H04W 76/30* (2018.02)

(58) Field of Classification Search
None
See application file for complete search history.

(56) References Cited

U.S. PATENT DOCUMENTS

| | | |
|---|---|---|
| 11,451,985 B2 | 9/2022 | Kimba Dit Adamou |
| 11,477,836 B2 | 10/2022 | Hong et al. |
| 2017/0071028 A1* | 3/2017 | Kuo .................. H04W 8/06 |
| 2017/0245254 A1 | 8/2017 | Kitagawa et al. |
| 2018/0279195 A1* | 9/2018 | Kim .................. H04W 36/22 |
| 2019/0394823 A1 | 12/2019 | Jo et al. |
| 2022/0110025 A1* | 4/2022 | Liu ............... H04W 36/0016 |

FOREIGN PATENT DOCUMENTS

| | | |
|---|---|---|
| CN | 102196496 A | 9/2011 |
| CN | 102726100 A | 10/2012 |
| CN | 105050152 A | 11/2015 |
| CN | 107432049 | 12/2017 |
| CN | 108029148 | 5/2018 |
| CN | 108924962 A | 11/2018 |
| CN | 109151928 | 1/2019 |

(Continued)

OTHER PUBLICATIONS

3GPP TS 23.303 V15.1.0 (Jun. 2018), "3rd Generation Partnership Project; Technical Specification Group Services and System Aspects; Proximity-based services (ProSe); Stage 2(Release 15)," 130 pages.

(Continued)

*Primary Examiner* — Anh Ngoc M Nguyen
(74) *Attorney, Agent, or Firm* — Slater Matsil, LLP

(57) ABSTRACT

This application provides a communication method and apparatus, and relates to the field of communication technologies. The method includes: a relay terminal detects that a link fault occurs on a first link, wherein the first link is a link between the relay terminal and a remote terminal; and the relay terminal sends first notification information to the access network device, wherein the first notification information is for notifying the access network device that a link fault occurs on the first link.

19 Claims, 19 Drawing Sheets

(56) References Cited

FOREIGN PATENT DOCUMENTS

| CN | 110167093 | | 8/2019 |
|----|-----------|---|--------|
| EP | 2555553 | B1 | 2/2019 |
| EP | 3471493 | A1 | 4/2019 |
| WO | 2018182286 | A1 | 10/2018 |
| WO | 2019157948 | A1 | 8/2019 |

OTHER PUBLICATIONS

3GPP TS 38.331 V15.7.0 (Sep. 2019), "3rd Generation Partnership Project; Technical Specification Group Radio Access Network; NR; Radio Resource Control (RRC) protocol specification(Release 15)," 527 pages.

\* cited by examiner

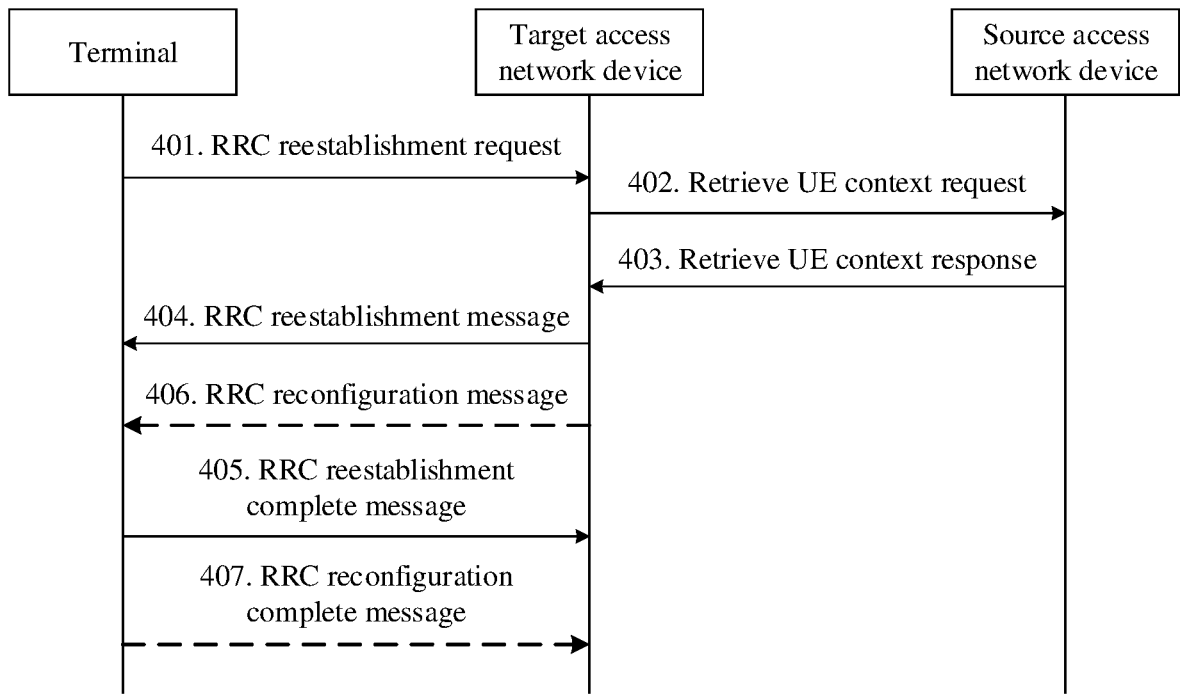

FIG. 4

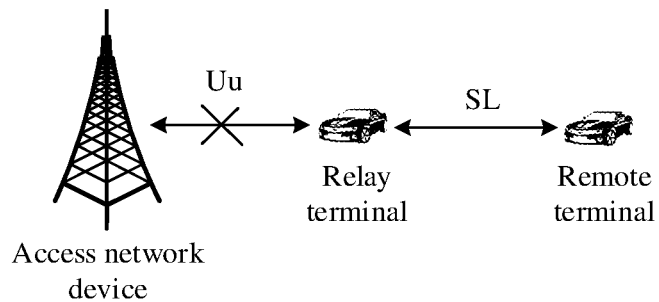

FIG. 5

601. A first relay terminal detects that a link fault occurs on a link between the first relay terminal and a first access network device, where the first access network device is an access network device accessed by the first relay terminal 602. The first relay terminal releases a unicast connection between the first relay terminal and a remote terminal, where the remote terminal communicates with a first core network device by using the first relay terminal

FIG. 6

1501. A first relay terminal detects that a link fault occurs on a link between the first relay terminal and a first access network device 1502. The first relay terminal releases a unicast connection between the first relay terminal and a remote terminal, where the remote terminal communicates with the first access network device by using the first relay terminal 2101. A remote terminal detects that a link fault occurs on a link between the remote terminal and a relay terminal, and the remote terminal communicates with a first access network device by using the relay terminal, where the first access network device is an access network device accessed by the relay terminal 2102. The remote terminal releases a unicast connection between the remote terminal and the relay terminal 2103. The remote terminal performs relay terminal reselection or cell reselection, and selects a second access network device for RRC reestablishment

FIG. 21

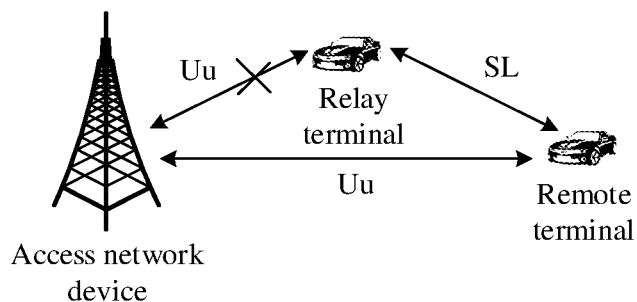

FIG. 22

LINK FAULT COMMUNICATION METHODS AND APPARATUSES

CROSS-REFERENCE TO RELATED APPLICATIONS

This application is a continuation of International Application No. PCT/CN2019/130984, filed on Dec. 31, 2019, the disclosure of which is hereby incorporated by reference in its entirety.

TECHNICAL FIELD

This application relates to the field of communication technologies, and in particular, to a communication method and apparatus.

BACKGROUND

In a wireless communication system, data communication may be performed between terminals by using an access network device. For example, refer to FIG. 1. When terminal 1 needs to send data to terminal 2, terminal 1 may first send the data to access network device 1, and access network device 1 sends the data to terminal 2. When terminal 2 needs to send data to terminal 3, terminal 2 may first send the data to access network device 1, access network device 1 sends the data to access network device 2, and then access network device 2 sends the data to terminal 3. Alternatively, the terminals may directly communicate with each other without using the access network device. For example, as shown in FIG. 1, terminal 1 may directly send data to terminal 2, and terminal 2 may directly send the data to terminal 3. An interface between the terminal and the access network device is referred to as a Uu interface, and an interface between the terminals is referred to as a PC5 interface. A communication link for direct communication between the terminals may be referred to as a sidelink (SL). On a sidelink, the terminals can directly perform data communication with each other without using the access network device, so that a data transmission delay can be greatly reduced.

To improve cell coverage, a terminal (which may be referred to as a remote terminal) may communicate with the access network device by using another terminal (which may be referred to as a relay terminal). This communication mode may be referred to as UE-to-Network Relay. For a schematic architectural diagram of a UE-to-Network relay system, refer to FIG. 2. Network elements in the UE-to-Network relay system include the access network device, the relay terminal, and the remote terminal. There is a connection between the access network device and the relay terminal, and there is also a connection between the relay terminal and the remote terminal. The relay terminal can help the remote terminal access a network for service data transmission. For example, in downlink transmission, the relay terminal may obtain data of the remote terminal by using the access network device, and forward the data to the remote terminal. It is the similar case for uplink transmission. To be specific, after obtaining data from the remote terminal, the relay terminal forwards the data to the access network device.

For the UE-to-Network relay system, both the Uu interface and the PC5 interface exist, and radio link failures (RLF) occur on both interfaces. If the relay terminal detects the RLF on the Uu interface, cell reselection of the relay terminal is triggered, and radio resource control (RRC) reestablishment is initiated after the relay terminal reselects an appropriate cell. For a unicast connection between the relay terminal and the remote terminal, if the relay terminal or the remote terminal detects the RLF on the PC5 interface, release of the unicast connection is triggered. Currently, the Uu interface and the PC5 interface work independently. Consequently, behaviors on the two interfaces are inconsistent, and a loss of data of the remote terminal is caused. For example, if the RLF occurs on the PC5 interface, downlink data received by the relay terminal from the access network device cannot be sent to the remote terminal, and the downlink data of the remote terminal may be lost.

SUMMARY

Embodiments of this application provide a communication method and apparatus, to avoid a loss of service data of a remote terminal.

According to a first aspect, a communication method is provided. The method includes: A first relay terminal releases a unicast connection between the first relay terminal and a remote terminal when detecting that a link fault occurs on a link between the first relay terminal and a first access network device. The first access network device is an access network device accessed by the first relay terminal, the remote terminal communicates with a network device by using the first relay terminal, and the network device is the first access network device or a first core network device. According to the method provided in the first aspect, after the link fault occurs on the link between the first relay terminal and the first access network device, the first relay terminal may release the unicast connection between the first relay terminal and the remote terminal, so that the remote terminal can perform RRC reestablishment in time, and recover the link of the remote terminal as quickly as possible, thereby avoiding a loss of service data of the remote terminal.

In a possible implementation, the method further includes: The first relay terminal sends, to the remote terminal, a message for releasing the unicast connection, where the message includes first indication information, and the first indication information indicates that a cause for releasing the unicast connection is that the link fault occurs on the link between the first relay terminal and the first access network device. In this possible implementation, the remote terminal may release the unicast connection between the remote terminal and the first relay terminal. In addition, the remote terminal may determine, based on the received first indication information, an action to be subsequently performed, for example, whether to select the first relay terminal during relay terminal reselection.

In a possible implementation, before that the first relay terminal releases a unicast connection between the first relay terminal and a remote terminal, the method further includes: The first relay terminal selects a processing manner for the link between the first relay terminal and the remote terminal, where the processing manner includes: releasing the unicast connection, and suspending the unicast connection. That the first relay terminal releases the unicast connection between the first relay terminal and the remote terminal includes: If the processing manner selected by the first relay terminal is releasing the unicast connection, the first relay terminal releases the unicast connection between the first relay terminal and the remote terminal. In this possible implementation, the first relay terminal may select the processing manner for the link between the first relay terminal and the remote terminal, to adapt to different network requirements.

In a possible implementation, the network device is the first core network device, and the method further includes: The first relay terminal performs cell reselection; the first relay terminal performs, in a reselected cell, RRC reestablishment with a second access network device that provides the cell; and the first relay terminal requests, by using the second access network device, a second core network device to release a user plane connection, where the user plane connection is established by the first relay terminal for the remote terminal. In this possible implementation, after releasing the unicast connection between the first relay terminal and the remote terminal, the first relay terminal may request the second core network device to release the user plane connection, to avoid a waste of network resources.

In a possible implementation, the method further includes: The first relay terminal receives a response from the second core network device, where the response indicates that the user plane connection is released. That the first relay terminal releases the unicast connection between the first relay terminal and the remote terminal includes: The first relay terminal releases the unicast connection between the first relay terminal and the remote terminal based on the response.

According to a second aspect, a communication apparatus is provided. The communication apparatus includes a processing unit. The processing unit is configured to: monitor a link between the communication apparatus and a first access network device, and release a unicast connection between the communication apparatus and a remote terminal if detecting that a link fault occurs. The first access network device is an access network device accessed by the communication apparatus, the remote terminal communicates with a network device by using the communication apparatus, and the network device is the first access network device or a first core network device.

In a possible implementation, the apparatus further includes a communication unit. The communication unit is configured to send, to the remote terminal, a message for releasing the unicast connection, where the message includes first indication information, and the first indication information indicates that a cause for releasing the unicast connection is that the link fault occurs on the link between the communication apparatus and the first access network device.

In a possible implementation, the processing unit is further configured to select a processing manner for the link between the communication apparatus and the remote terminal. The processing manner includes: releasing the unicast connection, and suspending the unicast connection. The processing unit is specifically configured to release the unicast connection between the communication apparatus and the remote terminal, when the processing manner selected by the communication apparatus is releasing the unicast connection.

In a possible implementation, the network device is the first core network device, and the processing unit is further configured to: perform cell reselection, and perform, in a reselected cell, RRC reestablishment with a second access network device that provides the cell. The processing unit is further configured to request, by using the communication unit and by using the second access network device, a second core network device to release a user plane connection, where the user plane connection is established by the communication apparatus for the remote terminal.

In a possible implementation, the communication unit is further configured to receive a response from the second core network device, where the response indicates that the user plane connection is released; and the processing unit is specifically configured to release the unicast connection between the communication apparatus and the remote terminal based on the response.

According to a third aspect, a communication method is provided. The communication method includes: A remote terminal receives, from a first relay terminal, a message for releasing a unicast connection, and releases the unicast connection based on the message. The unicast connection is a unicast connection between the remote terminal and the first relay terminal, the message includes first indication information, the first indication information indicates that a cause for releasing the unicast connection is that a link fault occurs on a link between the first relay terminal and a first access network device, the remote terminal communicates with a network device by using the first relay terminal, the network device is the first access network device or a first core network device, and the first access network device is an access network device accessed by the first relay terminal. According to the method provided in the third aspect, after the link fault occurs on the link between the first relay terminal and the first access network device, the first relay terminal may release the unicast connection between the first relay terminal and the remote terminal, so that the remote terminal can perform RRC reestablishment in time, and recover the link of the remote terminal as quickly as possible, thereby avoiding a loss of service data of the remote terminal. In addition, the remote terminal may determine, based on the received first indication information, an action to be subsequently performed, for example, whether to select the first relay terminal during relay terminal reselection.

In a possible implementation, the network device is the first access network device, and the method further includes: The remote terminal performs relay terminal reselection, and selects a second relay terminal; and the remote terminal performs RRC reestablishment with a third access network device by using the second relay terminal, where the third access network device is an access network device accessed by the second relay terminal. In this possible implementation, the remote terminal can perform RRC reestablishment in time, and recover the link of the remote terminal as quickly as possible, thereby avoiding a loss of service data of the remote terminal.

In a possible implementation, that the remote terminal performs RRC reestablishment with a third access network device by using the second relay terminal includes: The remote terminal sends an RRC reestablishment request to the third access network device by using the second relay terminal, where the RRC reestablishment request carries information indicating a first cell and information indicating the remote terminal within a scope of the first cell, and the first cell is a cell in which the remote terminal is located before the remote terminal releases the unicast connection. In this possible implementation, the third access network device can obtain information indicating the remote terminal, so that the third access network device can subsequently obtain a context of the remote terminal.

In a possible implementation, the information indicating the remote terminal within the scope of the first cell is an identifier that uniquely identifies the remote terminal in the first cell, or an identifier of the first relay terminal and an identifier that uniquely identifies the remote terminal within a scope of the first relay terminal.

According to a fourth aspect, a communication apparatus is provided. The communication apparatus includes a communication unit and a processing unit. The communication unit is configured to receive, from a first relay terminal, a message for releasing a unicast connection. The unicast connection is a unicast connection between the communication apparatus and the first relay terminal, the message includes first indication information, the first indication information indicates that a cause for releasing the unicast connection is that a link fault occurs on a link between the first relay terminal and a first access network device, the communication apparatus communicates with a network device by using the first relay terminal, the network device is the first access network device or a first core network device, and the first access network device is an access network device accessed by the first relay terminal. The processing unit is configured to release the unicast connection based on the message.

In a possible implementation, the network device is the first access network device, and the processing unit is configured to: perform relay terminal reselection, and select a second relay terminal; and perform RRC reestablishment with a third access network device by using the second relay terminal, where the third access network device is an access network device accessed by the second relay terminal.

In a possible implementation, the processing unit is specifically configured to send an RRC reestablishment request to the third access network device by using the communication unit and by using the second relay terminal, where the RRC reestablishment request carries information indicating a first cell and information indicating the communication apparatus within a scope of the first cell, and the first cell is a cell in which the communication apparatus is located before the communication apparatus releases the unicast connection.

In a possible implementation, the information indicating the communication apparatus within the scope of the first cell is an identifier that uniquely identifies the communication apparatus in the first cell, or an identifier of the first relay terminal and an identifier that uniquely identifies the communication apparatus within a scope of the first relay terminal.

According to a fifth aspect, a communication method is provided. The communication method includes: A third access network device sends a context request message to a first access network device, where the context request message is for requesting a context of a remote terminal, the remote terminal is handed over from the first access network device to the third access network device, the remote terminal communicates with the first access network device by using a first relay terminal before the remote terminal is handed over, the first access network device is an access network device accessed by the first relay terminal, the context request message includes information indicating a first cell and information indicating the remote terminal within a scope of the first cell, and the first cell is a cell in which the remote terminal is located before handover. The third access network device receives a context response message from the first access network device, where the context response message includes the context of the remote terminal. According to the method provided in the fifth aspect, the third access network device can obtain the context of the remote terminal, to perform RRC reestablishment with the remote terminal.

In a possible implementation, the method further includes: The third access network device receives an RRC reestablishment request from the first access network device, where the RRC reestablishment request carries the information indicating the first cell and the information indicating the remote terminal within the scope of the first cell.

In a possible implementation, the information indicating the remote terminal within the scope of the first cell is an identifier that uniquely identifies the remote terminal in the first cell, or an identifier of the first relay terminal and an identifier that uniquely identifies the remote terminal within a scope of the first relay terminal.

According to a sixth aspect, a communication apparatus is provided. The communication apparatus includes a communication unit and a processing unit. The processing unit is configured to send a context request message to a first access network device by using the communication unit, where the context request message is for requesting a context of a remote terminal, the remote terminal is handed over from the first access network device to the communication apparatus, the remote terminal communicates with the first access network device by using a first relay terminal before the remote terminal is handed over, the first access network device is an access network device accessed by the first relay terminal, the context request message includes information indicating a first cell and information indicating the remote terminal within a scope of the first cell, and the first cell is a cell in which the remote terminal is located before handover. The processing unit is further configured to receive a context response message from the first access network device by using the communication unit, where the context response message includes the context of the remote terminal.

In a possible implementation, the processing unit is further configured to receive an RRC reestablishment request from the first access network device by using the communication unit, where the RRC reestablishment request carries the information indicating the first cell and the information indicating the remote terminal within a scope of the first cell.

In a possible implementation, the information indicating the remote terminal within the scope of the first cell is an identifier that uniquely identifies the remote terminal in the first cell, or an identifier of the first relay terminal and an identifier that uniquely identifies the remote terminal within a scope of the first relay terminal.

According to a seventh aspect, a communication method is provided. The communication method includes: A first access network device receives a context request message from a third access network device, where the context request message is for requesting a context of a remote terminal, the remote terminal is handed over from the first access network device to the third access network device, the remote terminal communicates with the first access network device by using a first relay terminal before the remote terminal is handed over, the first access network device is an access network device accessed by the first relay terminal, the context request message includes information indicating a first cell and information indicating the remote terminal within a scope of the first cell, and the first cell is a cell in which the remote terminal is located before handover. The first access network device sends a context response message to the third access network device, where the context response message includes the context of the remote terminal. According to the method provided in the seventh aspect, the first access network device may provide the context of the remote terminal for the third access network device based on the information indicating the remote terminal within the scope of the first cell.

In a possible implementation, the information indicating the remote terminal within the scope of the first cell is an identifier that uniquely identifies the remote terminal in the first cell, or an identifier of the first relay terminal and an identifier that uniquely identifies the remote terminal within a scope of the first relay terminal.

According to an eighth aspect, a communication apparatus is provided. The communication apparatus includes a communication unit and a processing unit. The processing unit is configured to receive a context request message from a third access network device by using the communication unit, where the context request message is for requesting a context of a remote terminal, the remote terminal is handed over from the communication apparatus to the third access network device, the remote terminal communicates with the communication apparatus by using a first relay terminal before the remote terminal is handed over, the communication apparatus is an access network device accessed by the first relay terminal, the context request message includes information indicating a first cell and information indicating the remote terminal within a scope of the first cell, and the first cell is a cell in which the remote terminal is located before handover. The processing unit is further configured to send a context response message to the third access network device by using the communication unit, where the context response message includes the context of the remote terminal.

In a possible implementation, the information indicating the remote terminal within the scope of the first cell is an identifier that uniquely identifies the remote terminal in the first cell, or an identifier of the first relay terminal and an identifier that uniquely identifies the remote terminal within a scope of the first relay terminal.

According to a ninth aspect, a communication method is provided. The communication method includes: A first relay terminal detects that a link fault occurs on a link between the first relay terminal and a first access network device, where the first access network device is an access network device accessed by the first relay terminal; and the first relay terminal suspends a unicast connection between the first relay terminal and at least one remote terminal, where the at least one remote terminal communicates with a network device by using the first relay terminal, and the network device is the first access network device or a first core network device. According to the method provided in the ninth aspect, after the link fault occurs on the link between the first relay terminal and the first access network device, the first relay terminal may suspend the unicast connection between the first relay terminal and the remote terminal, so that the first relay terminal recovers the unicast connection after subsequently completing RRC reestablishment, thereby ensuring service continuity of the remote terminal.

In a possible implementation, the method further includes: The first relay terminal sends, to the at least one remote terminal, a message for suspending the unicast connection, where the message includes first indication information, and the first indication information indicates that a cause for suspending the unicast connection is that the link fault occurs on the link between the first relay terminal and the first access network device. In this possible implementation, the remote terminal may suspend the unicast connection between the remote terminal and the first relay terminal. In addition, the remote terminal may determine, based on the received first indication information, an action to be subsequently performed. For example, to meet a requirement of subsequent communication, the remote terminal determines whether to perform relay terminal reselection.

In a possible implementation, the method further includes: The first relay terminal selects a processing manner for the link between the first relay terminal and the at least one remote terminal, where the processing manner includes: releasing the unicast connection, and suspending the unicast connection. That the first relay terminal suspends the unicast connection between the first relay terminal and the at least one remote terminal includes: If the processing manner selected by the first relay terminal is suspending the unicast connection, the first relay terminal suspends the unicast connection between the first relay terminal and the at least one remote terminal. In this possible implementation, the first relay terminal may select the processing manner for the link between the first relay terminal and the remote terminal, to adapt to different network requirements.

In a possible implementation, the network device is the first access network device, and the method further includes: The first relay terminal performs cell reselection; and the first relay terminal sends an RRC reestablishment request to a second access network device. The RRC reestablishment request indicates the second access network device to obtain a context of the first relay terminal and a context of the at least one remote terminal when obtaining a context from the first access network device, or the RRC reestablishment request includes second indication information, and the second indication information indicates the second access network device to obtain a context of the first relay terminal and a context of the at least one remote terminal when obtaining a context from the first access network device. The second access network device is an access network device reselected by the first relay terminal. The remote terminal may communicate with the first access network device, and after the first relay terminal suspends the unicast connection between the first relay terminal and the remote terminal, if reestablishment of the first relay terminal succeeds, the remote terminal also needs to establish a connection to the second access network device. Therefore, the second access network device not only needs to obtain the context of the first relay terminal, but also needs to obtain the context of the remote terminal. In this possible implementation, the second access network device can obtain the context of the first relay terminal and the context of the remote terminal.

In a possible implementation, the method further includes: If RRC reestablishment between the first relay terminal and the second access network device succeeds, the first relay terminal separately sends third indication information to the at least one remote terminal, where the third indication information sent to one remote terminal indicates to recover a unicast connection between the first relay terminal and the remote terminal. In this possible implementation, the remote terminal can recover the unicast connection in time.

In a possible implementation, the method further includes: If RRC reestablishment between the first relay terminal and the second access network device fails, the first relay terminal separately sends fourth indication information to the at least one remote terminal, where the fourth indication information sent to one remote terminal indicates to release a unicast connection between the first relay terminal and the remote terminal. In this possible implementation, the remote terminal can perform RRC reestablishment in time, and recover the link of the remote terminal as quickly as possible, thereby avoiding a loss of service data of the remote terminal.

According to a tenth aspect, a communication apparatus is provided. The communication apparatus includes a processing unit. The processing unit is configured to: monitor a link between the communication apparatus and a first access network device, and suspend a unicast connection between the communication apparatus and at least one remote terminal if a link fault is detected. The first access network device is an access network device accessed by the communication apparatus, the at least one remote terminal communicates with a network device by using the communication apparatus, and the network device is the first access network device or a first core network device.

In a possible implementation, the apparatus further includes a communication unit. The communication unit is configured to send, to the at least one remote terminal, a message for suspending the unicast connection, where the message includes first indication information, and the first indication information indicates that a cause for suspending the unicast connection is that the link fault occurs on the link between the communication apparatus and the first access network device.

In a possible implementation, the processing unit is further configured to select a processing manner for the link between the communication apparatus and the at least one remote terminal. The processing manner includes: releasing the unicast connection, and suspending the unicast connection. The processing unit is specifically configured to suspend the unicast connection between the communication apparatus and the at least one remote terminal, when the processing manner selected by the communication apparatus is suspending the unicast connection.

In a possible implementation, the network device is the first access network device, and the processing unit is further configured to perform cell reselection; and the communication unit is further configured to send an RRC reestablishment request to a second access network device. The RRC reestablishment request indicates the second access network device to obtain a context of the communication apparatus and a context of the at least one remote terminal when obtaining a context from the first access network device, or the RRC reestablishment request includes second indication information, and the second indication information indicates the second access network device to obtain a context of the communication apparatus and a context of the at least one remote terminal when obtaining a context from the communication apparatus. The second access network device is an access network device reselected by the communication apparatus.

In a possible implementation, if RRC reestablishment between the communication apparatus and the second access network device succeeds, the communication unit is further configured to separately send third indication information to the at least one remote terminal, where the third indication information sent to one remote terminal indicates to recover a unicast connection between the communication apparatus and the remote terminal.

In a possible implementation, if RRC reestablishment between the communication apparatus and the second access network device fails, the communication unit is further configured to separately send fourth indication information to the at least one remote terminal, where the fourth indication information sent to one remote terminal indicates to release a unicast connection between the communication apparatus and the remote terminal.

According to an eleventh aspect, a communication method is provided. The communication method includes: A remote terminal receives, from a first relay terminal, a message for suspending a unicast connection, and suspends the unicast connection based on the message. The unicast connection is a unicast connection between the remote terminal and the first relay terminal, the message includes first indication information, the first indication information indicates that a cause for suspending the unicast connection is that a link fault occurs on a link between the first relay terminal and a first access network device, the remote terminal communicates with a network device by using the first relay terminal, the network device is the first access network device or a first core network device, and the first access network device is an access network device accessed by the first relay terminal. According to the method provided in the eleventh aspect, after the link fault occurs on the link between the first relay terminal and the first access network device, the first relay terminal may suspend the unicast connection between the first relay terminal and the remote terminal, so that the first relay terminal recovers the unicast connection after subsequently completing RRC reestablishment, thereby ensuring service continuity of the remote terminal. In addition, the remote terminal may determine, based on the received first indication information, an action to be subsequently performed. For example, to meet a requirement of subsequent communication, the remote terminal determines whether to perform relay terminal reselection.

In a possible implementation, the method further includes: The remote terminal receives third indication information from the first relay terminal, where the third indication information indicates to recover the unicast connection between the first relay terminal and the remote terminal; and the remote terminal recovers the unicast connection between the remote terminal and the first relay terminal based on the third indication information. In this possible implementation, the remote terminal can recover the unicast connection in time.

In a possible implementation, the method further includes: The remote terminal receives fourth indication information from the first relay terminal, where the fourth indication information indicates to release the unicast connection between the first relay terminal and the remote terminal; and the remote terminal releases the unicast connection between the remote terminal and the first relay terminal based on the fourth indication information. In this possible implementation, the remote terminal can perform RRC reestablishment in time, and recover the link of the remote terminal as quickly as possible, thereby avoiding a loss of service data of the remote terminal.

According to a twelfth aspect, a communication apparatus is provided. The communication apparatus includes a communication unit and a processing unit. The communication unit is configured to receive, from a first relay terminal, a message for suspending a unicast connection. The unicast connection is a unicast connection between the communication apparatus and the first relay terminal, the message includes first indication information, the first indication information indicates that a cause for suspending the unicast connection is that a link fault occurs on a link between the first relay terminal and a first access network device, the communication apparatus communicates with a network device by using the first relay terminal, the network device is the first access network device or a first core network device, and the first access network device is an access network device accessed by the first relay terminal. The processing unit is configured to suspend the unicast connection based on the message.

In a possible implementation, the communication unit is further configured to receive third indication information from the first relay terminal, where the third indication information indicates to recover the unicast connection between the first relay terminal and the communication apparatus; and the processing unit is further configured to recover the unicast connection between the communication apparatus and the first relay terminal based on the third indication information.

In a possible implementation, the communication unit is further configured to receive fourth indication information from the first relay terminal, where the fourth indication information indicates to release the unicast connection between the first relay terminal and the communication apparatus; and the processing unit is further configured to release the unicast connection between the communication apparatus and the first relay terminal based on the fourth indication information.

According to a thirteenth aspect, a communication method is provided. The communication method includes: A second access network device sends a context request message to a first access network device, where the context request message is for requesting a context of a first relay terminal and a context of at least one remote terminal, a unicast connection between the at least one remote terminal and the first relay terminal is suspended, and the first relay terminal is handed over from the first access network device to the second access network device; and the second access network device receives a context response message from the first access network device, where the context response message includes the context of the first relay terminal and the context of the at least one remote terminal. According to the method provided in the thirteenth aspect, the remote terminal may communicate with the first access network device, and after the first relay terminal suspends the unicast connection between the first relay terminal and the remote terminal, if reestablishment of the first relay terminal succeeds, the remote terminal also needs to establish a connection to the second access network device. Therefore, the second access network device not only needs to obtain the context of the first relay terminal, but also needs to obtain the context of the remote terminal. In this possible implementation, the second access network device can obtain the context of the first relay terminal and the context of the remote terminal.

In a possible implementation, the method further includes: The second access network device receives an RRC reestablishment request from the first access network device, where the RRC reestablishment request includes second indication information, and the second indication information indicates the second access network device to obtain the context of the first relay terminal and the context of the at least one remote terminal when obtaining a context from the first access network device.

According to a fourteenth aspect, a communication apparatus is provided. The communication apparatus includes a communication unit and a processing unit. The processing unit is configured to send a context request message to a first access network device by using the communication unit, where the context request message is for requesting a context of a first relay terminal and a context of at least one remote terminal, a unicast connection between the at least one remote terminal and the first relay terminal is suspended, and the first relay terminal is handed over from the first access network device to the communication apparatus. The processing unit is further configured to receive a context response message from the first access network device by using the communication unit, where the context response message includes the context of the first relay terminal and the context of the at least one remote terminal.

In a possible implementation, the processing unit is further configured to receive an RRC reestablishment request from the first access network device by using the communication unit, where the RRC reestablishment request includes second indication information, and the second indication information indicates the communication apparatus to obtain the context of the first relay terminal and the context of the at least one remote terminal when obtaining a context from the first access network device.

According to a fifteenth aspect, a communication method is provided. The communication method includes: A first access network device receives a context request message from a second access network device, where the context request message is for requesting a context of a first relay terminal and a context of at least one remote terminal, a unicast connection between the at least one remote terminal and the first relay terminal is suspended, and the first relay terminal is handed over from the first access network device to the second access network device; and the first access network device sends a context response message to the second access network device, where the context response message includes the context of the first relay terminal and the context of the at least one remote terminal. According to the method provided in the fifteenth aspect, the remote terminal may communicate with the first access network device, and after the first relay terminal suspends the unicast connection between the first relay terminal and the remote terminal, if reestablishment of the first relay terminal succeeds, the remote terminal also needs to establish a connection to the second access network device. Therefore, the second access network device not only needs to obtain the context of the first relay terminal, but also needs to obtain the context of the remote terminal. In this possible implementation, the second access network device can obtain the context of the first relay terminal and the context of the remote terminal.

According to a sixteenth aspect, a communication apparatus is provided. The communication apparatus includes a communication unit and a processing unit. The processing unit is configured to receive a context request message from a second access network device by using the communication unit, where the context request message is for requesting a context of a first relay terminal and a context of at least one remote terminal, a unicast connection between the at least one remote terminal and the first relay terminal is suspended, and the first relay terminal is handed over from the communication apparatus to the second access network device. The processing unit is further configured to send a context response message to the second access network device by using the communication unit, where the context response message includes the context of the first relay terminal and the context of the at least one remote terminal.

According to a seventeenth aspect, a communication method is provided. The communication method includes: A relay terminal detects that a link fault occurs on a link between the relay terminal and a remote terminal, and the remote terminal communicates with a first core network device by using the relay terminal; and the relay terminal requests, by using an access network device, a second core network device to release a user plane connection, where the user plane connection is established by the relay terminal for the remote terminal, and the access network device is an access network device accessed by the relay terminal. Currently, after detecting that the link fault occurs on the link between the relay terminal and the remote terminal, the relay terminal releases the unicast connection between the relay terminal and the remote terminal. In this case, according to the method provided in the seventeenth aspect, after releasing the unicast connection between the relay terminal and the remote terminal, the relay terminal may request the second core network device to release the user plane connection, to avoid a waste of network resources.

According to an eighteenth aspect, a communication apparatus is provided. The communication apparatus includes a communication unit and a processing unit. The processing unit is configured to monitor a link between the communication apparatus and a remote terminal. If detecting that a link fault occurs, the processing unit is configured to request, by using the communication unit and by using an access network device, a second core network device to release a user plane connection. The remote terminal communicates with a first core network device by using the communication apparatus, the user plane connection is established by the communication apparatus for the remote terminal, and the access network device is an access network device accessed by the communication apparatus.

According to a nineteenth aspect, a communication method is provided. The communication method includes: A remote terminal detects that a link fault occurs on a link between the remote terminal and a relay terminal, and the remote terminal communicates with a core network device by using the relay terminal; the remote terminal releases a unicast connection between the remote terminal and the relay terminal; and the remote terminal performs relay terminal reselection or cell reselection. Currently, after detecting that the link fault occurs on the link between the remote terminal and the relay terminal, the remote terminal releases only the unicast connection between the remote terminal and the relay terminal. According to the method provided in the nineteenth aspect, after releasing the unicast connection between the remote terminal and the relay terminal, the remote terminal may perform relay terminal reselection or cell reselection, to recover the link of the remote terminal as quickly as possible, and avoid a loss of service data of the remote terminal.

According to a twentieth aspect, a communication apparatus is provided. The communication apparatus includes a processing unit. The processing unit is configured to: monitor a link between the communication apparatus and a relay terminal, release a unicast connection between the communication apparatus and the relay terminal if detecting that a link fault occurs, and perform relay terminal reselection or cell reselection. The communication apparatus communicates with a core network device by using the relay terminal.

According to a twenty-first aspect, a communication method is provided. The communication method includes: A remote terminal detects that a link fault occurs on a link between the remote terminal and a relay terminal; the remote terminal communicates with a first access network device by using the relay terminal, where the first access network device is an access network device accessed by the relay terminal; the remote terminal releases a unicast connection between the remote terminal and the relay terminal; and the remote terminal performs relay terminal reselection or cell reselection, and selects a second access network device for RRC reestablishment. Currently, after detecting that the link fault occurs on the link between the remote terminal and the relay terminal, the remote terminal releases only the unicast connection between the remote terminal and the relay terminal. According to the method provided in the twenty-first aspect, after releasing the unicast connection between the remote terminal and the relay terminal, the remote terminal may perform relay terminal reselection or cell reselection, and select the second access network device for RRC reestablishment, so as to recover the link of the remote terminal as quickly as possible, and avoid a loss of service data of the remote terminal.

According to a twenty-second aspect, a communication apparatus is provided. The communication apparatus includes a processing unit. The processing unit is configured to: monitor a link between the communication apparatus and a relay terminal, release a unicast connection between the communication apparatus and the relay terminal if detecting that a link fault occurs, perform relay terminal reselection or cell reselection, and select a second access network device for RRC reestablishment. The communication apparatus communicates with a first access network device by using the relay terminal, and the first access network device is an access network device accessed by the relay terminal.

According to a twenty-third aspect, a communication method is provided. The communication method includes: A relay terminal detects that a link fault occurs on a link between the relay terminal and an access network device, where the access network device is an access network device accessed by the relay terminal; and the relay terminal sends notification information to a remote terminal, where the notification information is for notifying the remote terminal that the link fault occurs on the link between the relay terminal and the access network device. The remote terminal can communicate with the access network device by using the relay terminal, and can directly communicate with the access network device. According to the method provided in the twenty-third aspect, after detecting that the link fault occurs on the link between the relay terminal and the access network device, the relay terminal may send notification information to the access network device by using the remote terminal, so that the access network device reconfigures the relay terminal and/or the remote terminal.

According to a twenty-fourth aspect, a communication apparatus is provided. The communication apparatus includes a processing unit and a communication unit. The processing unit is configured to monitor a link between the communication apparatus and an access network device. The processing unit sends notification information to a remote terminal by using the communication unit if detecting that a link fault occurs. The access network device is an access network device accessed by the communication apparatus, the notification information is for notifying the remote terminal that the link fault occurs on the link between the communication apparatus and the access network device. The remote terminal can communicate with the access network device by using the communication apparatus, and can directly communicate with the access network device.

According to a twenty-fifth aspect, a communication method is provided. The communication method includes: A remote terminal receives notification information from a relay terminal, where the notification information is for notifying the remote terminal that a link fault occurs on a link between the relay terminal and an access network device. The remote terminal can communicate with the access network device by using the relay terminal, and can directly communicate with the access network device. The remote terminal sends the notification information to the access network device through a first path, where the first path is a data transmission path used when the access network device directly communicates with the remote terminal. According to the method provided in the twenty-fifth aspect, after detecting that the link fault occurs on the link between the relay terminal and the access network device, the relay terminal may send notification information to the access network device by using the remote terminal, so that the access network device reconfigures the relay terminal and/or the remote terminal.

In a possible implementation, the method further includes: The remote terminal sends a first identifier to the access network device through the first path, where the first identifier is an identifier used when the remote terminal communicates with the access network device by using the relay terminal. In this possible implementation, the access network device may learn of a correspondence between the first identifier and a second identifier, so that the access network device learns that the first path and a second path correspond to a same remote terminal.

According to a twenty-sixth aspect, a communication apparatus is provided. The communication apparatus includes a communication unit and a processing unit. The processing unit is configured to receive notification information from a relay terminal by using the communication unit, where the notification information is for notifying the communication apparatus that a link fault occurs on a link between the relay terminal and an access network device. The communication apparatus can communicate with the access network device by using the relay terminal, and can directly communicate with the access network device. The processing unit is further configured to send the notification information to the access network device through a first path by using the communication unit, where the first path is a data transmission path used when the access network device directly communicates with the communication apparatus.

In a possible implementation, the processing unit is further configured to send a first identifier to the access network device through the first path by using the communication unit, where the first identifier is an identifier used when the communication apparatus communicates with the access network device by using the relay terminal.

According to a twenty-seventh aspect, a communication method is provided. The communication method includes: An access network device receives notification information, where the notification information is for notifying the access network device that a link fault occurs on a link between a relay terminal and the access network device. The remote terminal can communicate with the access network device by using the relay terminal, and can directly communicate with the access network device. The access network device reconfigures the remote terminal and/or the relay terminal based on the notification information. According to the method provided in the twenty-seventh aspect, after detecting that the link fault occurs on the link between the relay terminal and the access network device, the relay terminal may send notification information to the access network device by using the remote terminal, so that the access network device reconfigures the relay terminal and/or the remote terminal.

In a possible implementation, the method further includes: The access network device receives a first identifier from the remote terminal through a first path, where the first identifier is an identifier used when the remote terminal communicates with the access network device by using the relay terminal, and the first path is a data transmission path used when the access network device directly communicates with the remote terminal. The access network device determines, based on the first identifier, that a terminal corresponding to the first identifier and a terminal corresponding to a second identifier are a same terminal, where the second identifier is an identifier used when the remote terminal directly communicates with the access network device. In this possible implementation, the access network device may learn of a correspondence between the first identifier and the second identifier, so that the access network device learns that the first path and a second path correspond to a same remote terminal.

According to a twenty-eighth aspect, a communication apparatus is provided. The communication apparatus includes a processing unit and a communication unit. The communication unit is configured to receive notification information, and the notification information is for notifying the communication apparatus that a link fault occurs on a link between a relay terminal and the communication apparatus. The remote terminal can communicate with the communication apparatus by using the relay terminal, and can directly communicate with the communication apparatus. The processing unit is configured to reconfigure the remote terminal and/or the relay terminal based on the notification information.

In a possible implementation, the communication unit is further configured to receive a first identifier from the remote terminal through a first path, where the first identifier is an identifier used when the remote terminal communicates with the communication apparatus by using the relay terminal, and the first path is a data transmission path used when the communication apparatus directly communicates with the remote terminal. The processing unit is further configured to determine, based on the first identifier, that a terminal corresponding to the first identifier and a terminal corresponding to a second identifier are a same terminal, where the second identifier is an identifier used when the remote terminal directly communicates with the communication apparatus.

According to a twenty-ninth aspect, a communication method is provided. The communication method includes: A terminal detects that a link fault occurs on a first link, where the terminal is a relay terminal or a remote terminal. The remote terminal can communicate with an access network device by using the relay terminal, and can directly communicate with the access network device. The first link is a link between the relay terminal and the remote terminal. The terminal sends notification information to the access network device, where the notification information is for notifying the access network device that the link fault occurs on the first link. According to the method provided in the twenty-ninth aspect, after detecting that the link fault occurs on the first link, the relay terminal or the remote terminal may send the notification information to the access network device, so that the access network device reconfigures the relay terminal and/or the remote terminal.

In a possible implementation, the terminal is the remote terminal, and that the terminal sends notification information to the access network device includes: The terminal sends the notification information to the access network device by using a direct communication link between the terminal and the access network device.

In a possible implementation, the terminal is the remote terminal, and the method further includes: The terminal sends a first identifier to the access network device through a first path, where the first identifier is an identifier used when the remote terminal communicates with the access network device by using the relay terminal, and the first path is a data transmission path used when the access network device directly communicates with the remote terminal. In this possible implementation, the access network device may learn of a correspondence between the first identifier and a second identifier, so that the access network device learns that the first path and a second path correspond to a same remote terminal.

According to a thirtieth aspect, a communication apparatus is provided. The communication apparatus includes a communication unit and a processing unit. The processing unit is configured to monitor a first link. The processing unit is further configured to send notification information to an access network device by using the communication unit if detecting a link fault. The communication apparatus is a relay terminal or a remote terminal. The remote terminal can communicate with the access network device by using the relay terminal, and can directly communicate with the access network device. The first link is a link between the relay terminal and the remote terminal. The notification information is for notifying the access network device that the link fault occurs on the first link.

In a possible implementation, the communication apparatus is the remote terminal, and the processing unit is further configured to send the notification information to the access network device by using the communication unit and by using a direct communication link between the communication apparatus and the access network device.

In a possible implementation, the communication apparatus is the remote terminal, and the processing unit is further configured to send a first identifier to the access network device by using the communication unit through a first path, where the first identifier is an identifier used when the remote terminal communicates with the access network device by using the relay terminal, and the first path is a data transmission path used when the access network device directly communicates with the remote terminal.

According to a thirty-first aspect, a communication method is provided. The communication method includes: An access network device receives notification information, where the notification information is for notifying the access network device that a link fault occurs on a first link, and the first link is a link between a relay terminal and a remote terminal. The remote terminal can communicate with the access network device by using the relay terminal, and can directly communicate with the access network device. The access network device reconfigures the remote terminal and/or the relay terminal based on the notification information. According to the method provided in the thirty-first aspect, after detecting that the link fault occurs on the first link, the relay terminal or the remote terminal may send the notification information to the access network device, so that the access network device reconfigures the relay terminal and/or the remote terminal.

In a possible implementation, the method further includes: The access network device receives a first identifier from the remote terminal through a first path, where the first identifier is an identifier used when the remote terminal communicates with the access network device by using the relay terminal, and the first path is a data transmission path used when the access network device directly communicates with the remote terminal. The access network device determines, based on the first identifier, that a terminal corresponding to the first identifier and a terminal corresponding to a second identifier are a same terminal, where the second identifier is an identifier used when the remote terminal directly communicates with the access network device.

According to a thirty-second aspect, a communication apparatus is provided. The communication apparatus includes a communication unit and a processing unit. The communication unit is configured to receive notification information, the notification information is for notifying the communication apparatus that a link fault occurs on a first link, and the first link is a link between a relay terminal and a remote terminal. The remote terminal can communicate with the communication apparatus by using the relay terminal, and can directly communicate with the communication apparatus. The processing unit is configured to reconfigure the remote terminal and/or the relay terminal based on the notification information.

In a possible implementation, the communication unit is further configured to receive a first identifier from the remote terminal through a first path, where the first identifier is an identifier used when the remote terminal communicates with the communication apparatus by using the relay terminal, and the first path is a data transmission path used when the communication apparatus directly communicates with the remote terminal. The processing unit is further configured to determine, based on the first identifier, that a terminal corresponding to the first identifier and a terminal corresponding to a second identifier are a same terminal, where the second identifier is an identifier used when the remote terminal directly communicates with the communication apparatus.

According to a thirty-third aspect, a communication method is provided. The communication method includes: A remote terminal detects that a link fault occurs on a direct communication link between the remote terminal and an access network device. The remote terminal can communicate with the access network device by using a relay terminal, and can directly communicate with the access network device. The remote terminal sends notification information to the access network device by using the relay terminal. The notification information is for notifying the access network device that the link fault occurs on the direct communication link between the remote terminal and the access network device. According to the method provided in the thirty-third aspect, after detecting that the link fault occurs on the direct communication link between the remote terminal and the access network device, the remote terminal may send the notification information to the access network device by using the relay terminal, so that the access network device reconfigures the relay terminal and/or the remote terminal.

In a possible implementation, the method further includes: The remote terminal sends a second identifier to the access network device through a second path, where the second identifier is an identifier used when the remote terminal directly communicates with the access network device, and the second path is a data transmission path used when the remote terminal communicates with the access network device by using the relay terminal. In this possible implementation, the access network device may learn of a correspondence between a first identifier and the second identifier, so that the access network device learns that a first path and the second path correspond to a same remote terminal.

According to a thirty-fourth aspect, a communication apparatus is provided. The communication apparatus includes a communication unit and a processing unit. The processing unit is configured to monitor a direct communication link between the communication apparatus and an access network device. The processing unit is further configured to send notification information to the access network device by using the communication unit and by using the relay terminal if detecting that a link fault occurs. The communication apparatus can communicate with the access network device by using the relay terminal, and can directly communicate with the access network device. The notification information is for notifying the access network device that the link fault occurs on the direct communication link between the communication apparatus and the access network device.

In a possible implementation, the processing unit is further configured to send a second identifier to the access network device by using the communication unit through a second path, where the second identifier is an identifier used when the communication apparatus directly communicates with the access network device, and the second path is a data transmission path used when the communication apparatus communicates with the access network device by using the relay terminal.

According to a thirty-fifth aspect, a communication method is provided. The communication method includes: An access network device receives notification information, where the notification information is for notifying the access network device that a link fault occurs on a direct communication link between a remote terminal and the access network device. The access network device reconfigures the remote terminal and/or the relay terminal based on the notification information. According to the method provided in the thirty-fifth aspect, after detecting that the link fault occurs on the direct communication link between the remote terminal and the access network device, the remote terminal may send the notification information to the access network device by using the relay terminal, so that the access network device reconfigures the relay terminal and/or the remote terminal.

In a possible implementation, the method further includes: The access network device receives a second identifier from the remote terminal through a second path, where the second identifier is an identifier used when the remote terminal directly communicates with the access network device, and the second path is a data transmission path used when the remote terminal communicates with the access network device by using the relay terminal. The access network device determines, based on the second identifier, that a terminal corresponding to the second identifier and a terminal corresponding to a first identifier are a same terminal, where the first identifier is an identifier used when the remote terminal communicates with the access network device by using the relay terminal.

According to a thirty-sixth aspect, a communication apparatus is provided. The communication apparatus includes a communication unit and a processing unit. The communication unit is configured to receive notification information, where the notification information is for notifying the communication apparatus that a link fault occurs on a direct communication link between a remote terminal and the communication apparatus. The processing unit is configured to reconfigure the remote terminal and/or the relay terminal based on the notification information.

In a possible implementation, the communication unit is further configured to receive a second identifier from the remote terminal through a second path, where the second identifier is an identifier used when the remote terminal directly communicates with the communication apparatus, and the second path is a data transmission path used when the remote terminal communicates with the communication apparatus by using the relay terminal. The processing unit is further configured to determine, based on the second identifier, that a terminal corresponding to the second identifier and a terminal corresponding to the first identifier are a same terminal, where the first identifier is an identifier used when the remote terminal communicates with the communication apparatus by using the relay terminal.

According to a thirty-seventh aspect, a communication apparatus is provided. The communication apparatus includes a memory and a processor. Optionally, the communication apparatus further includes at least one communication interface and a communication bus. The memory is configured to store computer-executable instructions. The processor, the memory, and the at least one communication interface are connected by using the communication bus. The processor executes the computer-executable instructions stored in the memory, to enable the communication apparatus to implement the method provided in any one of the first aspect, the third aspect, the fifth aspect, the seventh aspect, the ninth aspect, the eleventh aspect, the thirteenth aspect, the fifteenth aspect, the seventeenth aspect, the nineteenth aspect, the twenty-first aspect, the twenty-third aspect, the twenty-fifth aspect, the twenty-seventh aspect, the twenty-ninth aspect, the thirty-first aspect, the thirty-third aspect, and the thirty-fifth aspect. The apparatus may exist in a form of a chip product.

According to a thirty-eighth aspect, a communication system is provided. The communication system includes the communication apparatuses provided in the second aspect and the fourth aspect, the communication apparatuses provided in the sixth aspect and the eighth aspect, the communication apparatuses provided in the tenth aspect and the twelfth aspect, the communication apparatuses provided in the fourteenth aspect and the sixteenth aspect, the communication apparatuses provided in the twenty-fourth aspect, the twenty-sixth aspect, and the twenty-eighth aspect, the communication apparatuses provided in the thirtieth aspect and the thirty-second aspect, or the communication apparatuses provided in the thirty-fourth aspect and the thirty-sixth aspect.

According to a thirty-ninth aspect, a computer-readable storage medium is provided. The computer-readable storage medium includes instructions. When the instructions are run on a computer, the computer is enabled to perform the method provided in any one of the first aspect, the third aspect, the fifth aspect, the seventh aspect, the ninth aspect, the eleventh aspect, the thirteenth aspect, the fifteenth aspect, the seventeenth aspect, the nineteenth aspect, the twenty-first aspect, the twenty-third aspect, the twenty-fifth aspect, the twenty-seventh aspect, the twenty-ninth aspect, the thirty-first aspect, the thirty-third aspect, and the thirty-fifth aspect.

According to a fortieth aspect, a computer program product including instructions is provided. When the computer program product runs on a computer, the computer is enabled to perform the method provided in any one of the first aspect, the third aspect, the fifth aspect, the seventh aspect, the ninth aspect, the eleventh aspect, the thirteenth aspect, the fifteenth aspect, the seventeenth aspect, the nineteenth aspect, the twenty-first aspect, the twenty-third aspect, the twenty-fifth aspect, the twenty-seventh aspect, the twenty-ninth aspect, the thirty-first aspect, the thirty-third aspect, and the thirty-fifth aspect.

According to a forty-first aspect, a chip is provided. The chip includes: a processor and an interface. The processor is coupled to a memory through the interface. When the processor executes a computer program or instructions in the memory, the method provided in any one of the first aspect, the third aspect, the fifth aspect, the seventh aspect, the ninth aspect, the eleventh aspect, the thirteenth aspect, the fifteenth aspect, the seventeenth aspect, the nineteenth aspect, the twenty-first aspect, the twenty-third aspect, the twenty-fifth aspect, the twenty-seventh aspect, the twenty-ninth aspect, the thirty-first aspect, the thirty-third aspect, and the thirty-fifth aspect is performed.

In the foregoing aspects, for beneficial effects of the apparatuses corresponding to the methods, refer to the beneficial effects of the corresponding methods. Details are not described again. It should be noted that various possible implementations of any one of the foregoing aspects may be combined provided that the solutions are not contradictory.

BRIEF DESCRIPTION OF THE DRAWINGS

FIG. 4 is a flowchart of an RRC reestablishment process according to an embodiment of this application;

FIG. 5 is a schematic diagram of a link fault according to an embodiment of this application;

FIG. 6 to FIG. 11 each are a flowchart of a communication method according to an embodiment of this application;

FIG. 13 to FIG. 21 each are a flowchart of a communication method according to an embodiment of this application;

FIG. 22 is a schematic diagram of a link fault according to an embodiment of this application;

DETAILED DESCRIPTION OF ILLUSTRATIVE EMBODIMENTS

Figure 1:
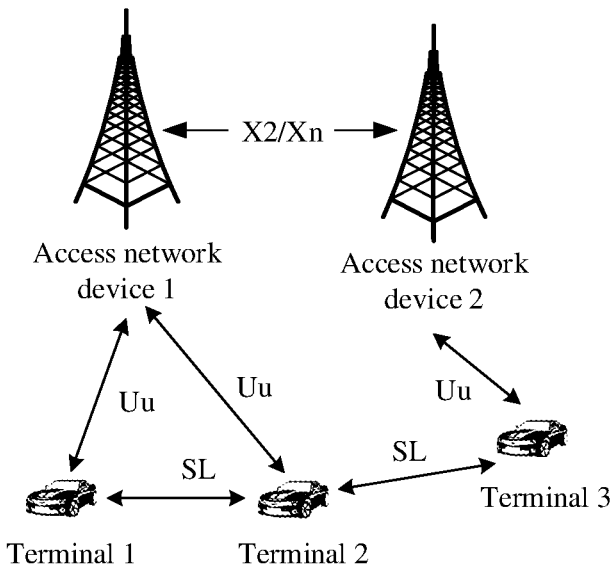
FIG. 1 to FIG. 3 are schematic diagrams of communication scenarios according to embodiments of this application.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or design solution described by using "example" or "for example" in this application shall not be construed as being more preferred or more advantageous than another embodiment or design solution. Exactly, use of the term such as "example" or "for example" is intended to present a related concept in a specific manner.

Network elements in this application include an access network device and a terminal in a communication system. Methods provided in embodiments of this application may be applied to the architecture shown in FIG. 2, or may be applied to the architecture shown in FIG. 3. It should be noted that, in FIG. 2, generally, a remote terminal may be understood as an edge terminal (that is, a terminal located at a cell edge). Because the edge terminal has poor communication signals, the edge terminal needs to use a relay terminal to communicate with a core network device or an access network device. However, it is not excluded that a non-edge terminal communicates with the core network device or the access network device in the manner shown in FIG. 2. In the architecture shown in FIG. 3, the remote terminal may communicate with the access network device by using the relay terminal, or may directly communicate with the access network device through a Uu interface. In this case, data transmission reliability of the remote terminal can be improved.

The communication system in embodiments of this application includes but is not limited to a long term evolution (LTE) system, a 5th generation (5G) system, a new radio (NR) system, and a wireless local area network (WLAN) system and a future evolution system or a plurality of converged communication systems.

The access network device in embodiments of this application is an entity that is on a network side and that is configured to send a signal, receive a signal, or send a signal and receive a signal. The access network device may be an apparatus that is deployed on a radio access network (RAN) and that provides a wireless communication function for a terminal, for example, may be a transmission reception point (TRP), a base station, or control nodes in various forms (for example, a network controller and a radio controller (for example, a radio controller in a cloud radio access network (CRAN) scenario)). Specifically, the access network device may be a macro base station, a micro base station (also referred to as a small cell), a relay station, an access point (AP), or the like in various forms, or may be an antenna panel of a base station. The control node may be connected to a plurality of base stations, and configure resources for a plurality of terminals covered by the plurality of base stations. In systems using different radio access technologies, devices that have base station functions may have different names. For example, the device may be referred to as an evolved NodeB (evolved NodeB, eNB or eNodeB) in the LTE system, or may be referred to as a next generation node base station (gNB) in the 5G system or the NR system. A specific name of the base station is not limited in this application. Alternatively, the access network device may be an access network device or the like in a future evolved public land mobile network (PLMN).

The terminal in embodiments of this application is an entity that is on a user side and that is configured to receive a signal, send a signal, or receive a signal and send a signal. The terminal is configured to provide a user with one or more of a voice service and a data connectivity service. The terminal may also be referred to as user equipment (UE) (in this case, the relay terminal may be referred to as relay UE, and the remote terminal may be referred to as remote UE), a terminal device, an access terminal, a subscriber unit, a subscriber station, a mobile station, a remote station, a remote terminal, a mobile device, a user terminal, a wireless communication device, a user agent, or a user apparatus. The terminal may be a vehicle to everything (V2X) device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (HEV), a range extended electric vehicle (REEV), a plug-in hybrid electric vehicle (PHEV), or a new energy vehicle (new energy vehicle). Alternatively, the terminal may be a device-to-device (D2D) device, for example, an electricity meter or a water meter. Alternatively, the terminal may be a mobile station (MS), a subscriber unit (subscriber unit), an unmanned aerial vehicle, an internet of things (IoT) device, a station (ST) in a WLAN, a cellular phone (cellular phone), a smartphone (smartphone), a cordless telephone set, a wireless data card, a tablet computer, a session initiation protocol (SIP) phone, a wireless local loop (WLL) station, a personal digital assistant (PDA) device, a laptop computer (laptop computer), a machine type communication (MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

The methods provided in embodiments of this application are applicable to but are not limited to the following fields: D2D, V2X, unmanned driving (unmanned driving), automated driving (ADS), assisted driving (ADAS), intelligent driving (intelligent driving), connected driving (connected driving), intelligent network driving (intelligent network driving), car sharing (car sharing), and the like.

Figure 2:
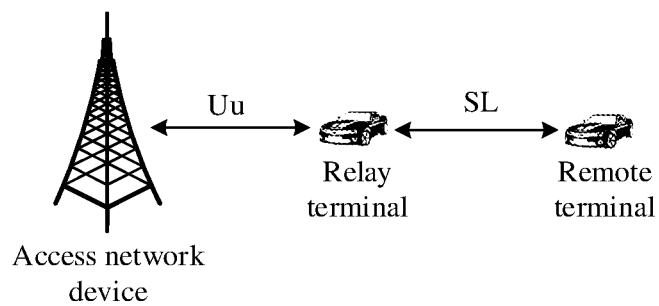
Figure 3:
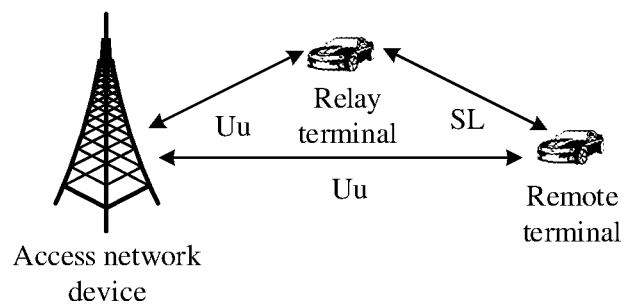

Currently, a vehicle may obtain road condition information or receive an information service in time through vehicle to vehicle (V2V) communication, vehicle to infrastructure (V2I) communication, vehicle to pedestrian (V2P) communication, or vehicle to network (V2N) communication. The communication manners may be collectively referred to as V2X communication. A typical application scenario of sidelink communication is V2X. In V2X, each vehicle is a terminal. FIG. 2 and FIG. 3 are drawn by using an example in which the terminal is a vehicle. Alternatively, the terminal may be another device. This is not limited in this application.

To make embodiments of this application clearer, some concepts or content in embodiments of this application are first briefly described.

1. Communication Type Supported on a Sidelink

The communication type includes broadcast communication, multicast communication, and unicast communication. In an LTE system, the broadcast communication is supported on the sidelink. In an NR system, the broadcast communication, the multicast communication, and the unicast communication are supported on the sidelink.

The broadcast communication is similar to broadcasting system information by the access network device. To be specific, a terminal sends data of broadcast service to the outside without encryption. Any other terminal within an effective reception scope may receive the broadcast service data if the terminal is interested in the broadcast service.

The multicast communication refers to communication between all terminals in a communication group, and any terminal in the group can receive and send multicast service data.

The unicast communication is similar to data communication performed after an RRC connection is established between a terminal and an access network device, and a unicast connection needs to be first established between two terminals. After the unicast connection is established, the two terminals may perform data communication based on a negotiated identifier. The data may be encrypted, or may not be encrypted. Compared with the broadcast communication, the unicast communication can be performed only between two terminals that have established a unicast connection.

The methods provided in embodiments of this application are mainly applied to a unicast communication scenario on a sidelink.

2. Protocol Stack in a UE-to-Network Relay System

From the perspective of the protocol stack, UE-to-Network relay is classified into L3 relay (L3 relay) and L2 relay (L2 relay).

In the L3 relay, a relay terminal performs a relay based on an internet protocol (IP) layer. On a user plane and a control plane, there is no peer protocol layer between the access network device and the remote terminal. In this case, the access network device cannot see the remote terminal, but can see only the relay terminal. In other words, when information sent by the remote terminal arrives at the access network device, the access network device does not parse the information, but directly forwards the information to a core network device. In this case, it may be considered that the remote terminal communicates with the core network device by using the relay terminal. Therefore, in the following descriptions of this application, if "the remote terminal communicates with the core network device by using the relay terminal" is described, it indicates that the UE-to-Network relay system is an L3 relay system.

In the L2 relay, the relay terminal may perform a relay based on a packet data convergence protocol (PDCP) layer or a protocol layer (for example, a backhaul adaptation protocol (BAP) layer (which may also be referred to as an adaptation layer), or a radio link control (RLC) layer) below the PDCP layer. On the user plane, the access network device and the remote terminal may have peer PDCP layers, peer service data adaptation protocol (SDAP) layers, and the like. On the control plane, there may be peer RRC layers, peer PDCP layers, and the like between the access network device and the remote terminal. In other words, an RRC connection is established between the remote terminal and the access network device, and an RRC message may be exchanged by using the relay terminal. In this case, it may be considered that the remote terminal communicates with the access network device by using the relay terminal. Therefore, in the following descriptions of this application, if "the remote terminal communicates with the access network device by using the relay terminal" is described, it indicates that the UE-to-Network relay system is an L2 relay system.

3. Existing processing mechanism used when an RLF occurs on the Uu interface or a PC5 interface On the Uu interface, if the relay terminal detects the RLF, RRC reestablishment is triggered. After the RRC reestablishment is triggered, the relay terminal may first perform cell reselection, reselect a suitable cell, and then initiate RRC reestablishment. An access network device accessed by the relay terminal after RRC reestablishment is performed may be referred to as a target access network device, and an access network device accessed by the relay terminal before cell reselection is performed may be referred to as a source access network device. For a specific RRC reestablishment procedure, refer to FIG. 4. The procedure includes the following steps.

401. When a relay terminal and a source access network device are in connected mode, if the relay terminal detects an RLF on a Uu interface, the relay terminal enters idle mode, performs cell reselection, finds an appropriate target access network device, and sends an RRC reestablishment request (RRC reestablishment request) to the target access network device.

The RRC reestablishment request is for requesting RRC reestablishment.

402. The target access network device sends a retrieve UE context request (retrieve UE context request) to the source access network device based on the RRC reestablishment request.

The retrieve UE context request is for requesting a context of the relay terminal.

403. The source access network device sends a retrieve UE context response (retrieve UE context response) to the target access network device based on the retrieve UE context request.

The retrieve UE context response may include the context of the relay terminal.

404. The target access network device sends an RRC reestablishment (RRC reestablishment) message to the relay terminal.

The RRC reestablishment message is for responding to the RRC reestablishment request.

405. The relay terminal sends an RRC reestablishment complete (RRC reestablishment complete) message to the target access network device.

The RRC reestablishment complete message is for notifying the target access network device that RRC reestablishment is completed.

Optionally, the RRC reestablishment procedure further includes the following steps:

406. The target access network device sends an RRC reconfiguration (RRC reconfiguration) message to the relay terminal.

The RRC reconfiguration message is for performing RRC reconfiguration on the relay terminal.

To complete reconfiguration of the relay terminal earlier, step 406 may be performed before step 405.

407. The relay terminal sends an RRC reconfiguration complete (RRC reconfiguration complete) message to the target access network device based on the RRC reconfiguration message.

The RRC reconfiguration complete message indicates that RRC reconfiguration is completed.

It should be noted that, if the target access network device fails to perform RRC reconfiguration on the relay terminal, for example, when the relay terminal finds, after receiving the RRC reconfiguration message, that the relay terminal cannot perform a configuration in the RRC reconfiguration message, the relay terminal does not use the configuration in the RRC reconfiguration message for communication. In this case, configurations used by the target access network device and the relay terminal are inconsistent, and communication cannot be performed. After receiving the RRC reconfiguration message, the relay terminal may not return any message to the target access network device, but reselects another access network device for RRC reestablishment.

If the target access network device completes RRC reconfiguration on the relay terminal, the target access network device may update a downlink path, forward data, and the like by interacting with the source access network device and a core network device (for example, an access and mobility management function (core access and mobility management function, AMF)). For details, refer to the current technologies. This is not limited in this application.

On a PC5 interface, if the remote terminal detects an RLF (that is, detects that an RLF occurs on an SL), release of a unicast connection is triggered.

Currently, for a UE-to-Network relay system, the Uu interface and the PC5 interface work independently. Consequently, behaviors on the two interfaces are inconsistent, and a loss of data of the remote terminal is caused. For example, if an RLF occurs on the PC5 interface, downlink data received by the relay terminal from an access network device cannot be sent to the remote terminal, and the downlink data of the remote terminal may be lost.

An embodiment of this application provides a communication method. The method may be applied to the UE-to-Network relay system, to implement fast recovery of a link, reduce user plane interruption of the remote terminal, and ensure service continuity. Specifically, Embodiment 1 to Embodiment 3 below are separately used for description.

Embodiment 1

Applicable system and system architecture: an L3 relay UE-to-Network relay system and the system architecture shown in FIG. 2.

In the L3 relay UE-to-Network relay system, the remote terminal establishes a connection to a first core network device (for example, a user plane function (user plane function, UPF)) by using the relay terminal. The access network device cannot see the remote terminal (in other words, there is no connection between the access network device and the remote terminal), but can only see the relay terminal (in other words, there is a connection only between the access network device and the relay terminal). The access network device does not have a context of the remote terminal, but has only a context of the relay terminal.

Optionally, the relay terminal allocates an IP address or a port number to the remote terminal, and communicates with the first core network device by using the IP address or the port number. Downlink transmission is used as an example. After receiving data that carries the IP address or the port number, the relay terminal can learn that the data belongs to the remote terminal, and then send the data to the remote terminal by using a sidelink unicast connection on the PC5 interface.

In the system architecture shown in FIG. 2, the communication method provided in Embodiment 1 varies in different scenarios. The following separately describes the communication method in Scenario 1 to Scenario 3.

Scenario 1: A link fault occurs on a link between the relay terminal and the access network device (for example, as shown in FIG. 5), and the link fault is detected by the relay terminal.

In Scenario 1, the communication method provided in Embodiment 1 may include a communication method provided in Solution 1.1 and/or a communication method provided in Solution 1.2 below.

Solution 1.1

As shown in FIG. 6, the communication method provided in Solution 1.1 includes step 601 and step 602.

601. A first relay terminal detects that a link fault occurs on a link between the first relay terminal and a first access network device, where the first access network device is an access network device accessed by the first relay terminal.

In embodiments of this application, that a link fault occurs on a link may include one or more of the following cases: 1. An RLF occurs on the link. 2. Configuration, for example, RRC reconfiguration, performed on a terminal on the link fails. Details are not described below.

For the RLF, the first relay terminal may determine, based on a quantity of RLC retransmissions and an in-synchronization (in sync or in synchronization, IS)/out-of-synchronization (OoS) indication, whether the RLF occurs on the link between the first relay terminal and the first access network device. For example, if the quantity of RLC retransmissions performed by the first relay terminal on the link reaches a maximum quantity of RLC retransmissions, it is considered that an RLF occurs on the link. For another example, if the first relay terminal receives a preset quantity of consecutive OoS indications on the link within a preset time period, it is considered that an RLF occurs on the link.

For the configuration failure, if the first relay terminal receives configuration information, but cannot perform a configuration in the configuration information, it is considered that the configuration fails.

602. The first relay terminal releases a unicast connection between the first relay terminal and a remote terminal, where the remote terminal communicates with a first core network device by using the first relay terminal.

The first relay terminal may provide a relay service for a plurality of remote terminals. The remote terminal in this embodiment of this application may be any one of the plurality of remote terminals.

When the link fault occurs on the link between the first relay terminal and the first access network device, data transmission is interrupted and the first relay terminal cannot help the remote terminal forward data. In this case, the unicast connection established between the first relay terminal and the remote terminal for a relay is released.

Optionally, after step 601, the method further includes step 603 to step 605.

603. The first relay terminal performs cell reselection.

The first relay terminal may camp on a new cell through cell reselection.

604. The first relay terminal performs RRC reestablishment in the reselected cell with a second access network device that provides the cell.

For a process in which the first relay terminal performs RRC reestablishment, refer to the foregoing descriptions of the RRC reestablishment process. Details are not described again.

605. The first relay terminal requests, by using the second access network device, a second core network device (for example, an AMF) to release a user plane connection.

The user plane connection is established by the first relay terminal for the remote terminal, and is specifically a protocol data unit (PDU) session or a quality of service (QoS) flow established between the remote terminal and the first core network device.

Specifically, the first relay terminal may trigger non-access stratum (NAS) signaling, to indicate the second core network device to release the PDU session or the QoS flow that is established by the relay terminal for the remote terminal.

Optionally, after step 605, the method further includes step 606.

606. The first relay terminal receives a response from the second core network device, where the response indicates that the user plane connection is released.

In this case, during specific implementation, step 602 may include: The first relay terminal releases the unicast connection between the first relay terminal and the remote terminal based on the response. In other words, the first relay terminal may release the unicast connection between the first relay terminal and the remote terminal only after receiving the response. If the first relay terminal does not receive the response, the first relay terminal does not release the unicast connection between the first relay terminal and the remote terminal.

It should be noted that after establishing an RRC connection to the second access network device through RRC reestablishment, the first relay terminal recovers all previous user plane connections by default. However, in this case, because the unicast connection between the first relay terminal and the remote terminal has been released, a relay service does not need to be provided for the remote terminal. Therefore, after RRC reestablishment, the first relay terminal needs to request the second core network device to release the user plane connection that is established by the first relay terminal for the remote terminal and the first core network device.

It may be understood that if step 602 needs to be implemented based on the response returned by the second core network device, step 603 to step 605 may be performed before step 602. Otherwise, step 603 to step 605 may be performed before step 602, or may be performed after step 602. This is not limited in this application.

It should be noted that, after the first relay terminal performs RRC reestablishment with the second access network device, because there is no connection between the first access network device and the remote terminal, the second access network device may request only a context of the first relay terminal when requesting a context from the first access network device.

Optionally, before step 602, the method further includes step 601-A.

601-A. The first relay terminal selects a processing manner for the link between the first relay terminal and the remote terminal, where the processing manner includes: releasing the unicast connection, and suspending the unicast connection. In this case, during specific implementation, step 602 may include: If the processing manner selected by the first relay terminal is releasing the unicast connection, the first relay terminal releases the unicast connection between the first relay terminal and the remote terminal. Alternatively, if the processing manner selected by the first relay terminal is suspending the unicast connection, refer to Solution 1.2 for subsequent processing.

It should be noted that during specific implementation of step 602, the first relay terminal may release the unicast connection between the first relay terminal and the remote terminal when receiving the response returned by the second core network device, may release the unicast connection between the first relay terminal and the remote terminal when the selected processing manner is releasing the unicast connection, or may release the unicast connection between the first relay terminal and the remote terminal only when receiving the response returned by the second core network device and the selected processing manner is releasing the unicast connection.

Optionally, the method further includes step 607 and step 608.

607. The first relay terminal sends, to the remote terminal, a message for releasing the unicast connection, where the message includes first indication information, and the first indication information indicates that a cause for releasing the unicast connection is that the link fault occurs on the link between the first relay terminal and the first access network device. Correspondingly, the remote terminal receives, from the first relay terminal, the message for releasing the unicast connection.

For example, the first indication information may be carried in an RRC message on a PC5 interface, or carried in PC5-S signaling on a PC5 interface. Alternatively, the first indication information may not be carried in the message for releasing the unicast connection, but is carried in another message. In addition, the first relay terminal may not send the first indication information to the remote terminal, but only indicate the remote terminal to release the unicast connection.

608. The remote terminal releases the unicast connection between the remote terminal and the first relay terminal based on the message.

After step 608, the remote terminal may determine, based on the received first indication information, an action to be subsequently performed. For example, to improve an access success rate, the remote terminal may no longer select the first relay terminal during relay terminal reselection.

Step 607 and step 608 may be performed after step 601, and there is no execution sequence between step 607 and step 608 and other steps.

Optionally, after step 608, the method further includes step 609.

609. The remote terminal performs relay terminal reselection, and selects a second relay terminal.

After the remote terminal releases the unicast connection between the remote terminal and the first relay terminal, to ensure normal communication of the remote terminal, the remote terminal may perform relay terminal reselection, and communicate with a core network by using the reselected second relay terminal.

Figure 7:
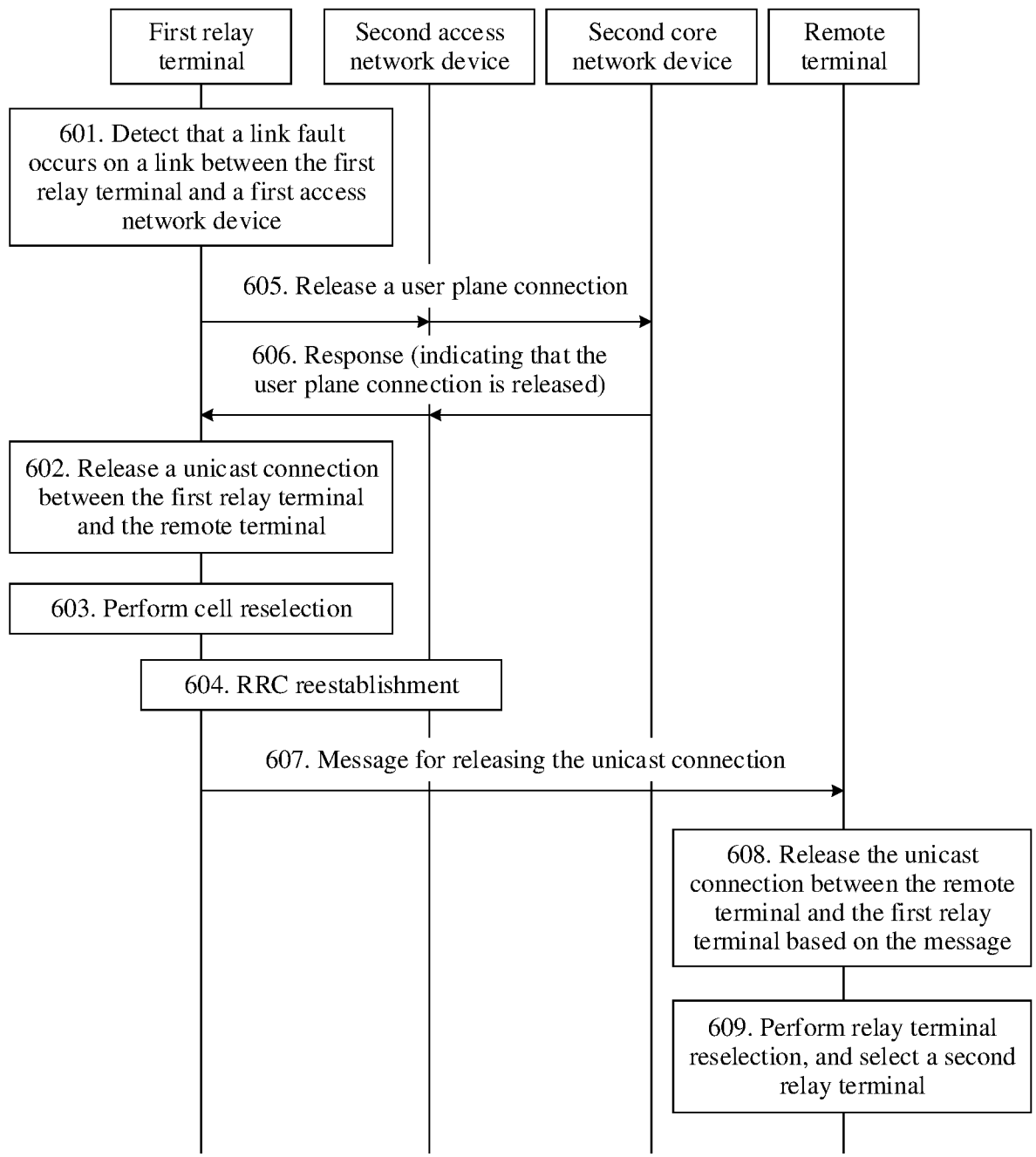
Figure 8:
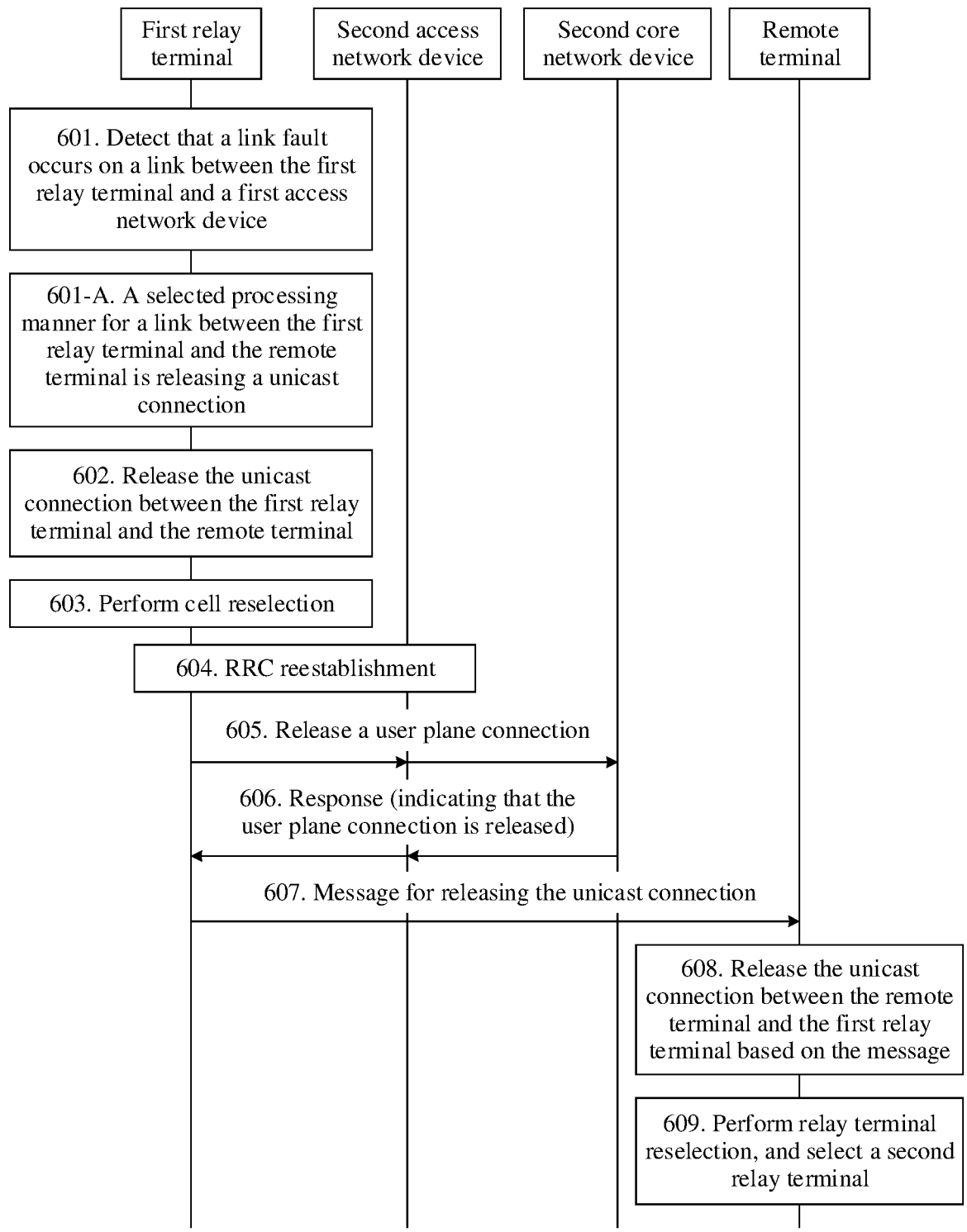

For clearer understanding of Solution 1.1, FIG. 7 and FIG. 8 each show an implementation procedure of Solution 1.1. Step numbers in the figures are drawn based on step numbers in Solution 1.1. For understanding of the steps, refer to the steps in Solution 1.1. However, this does not limit the implementation procedure of Solution 1.1. The implementation procedure of Solution 1.1 may alternatively have more or fewer steps than those in the figure, or may have steps different from those in the figure.

Solution 1.2

Figure 9:
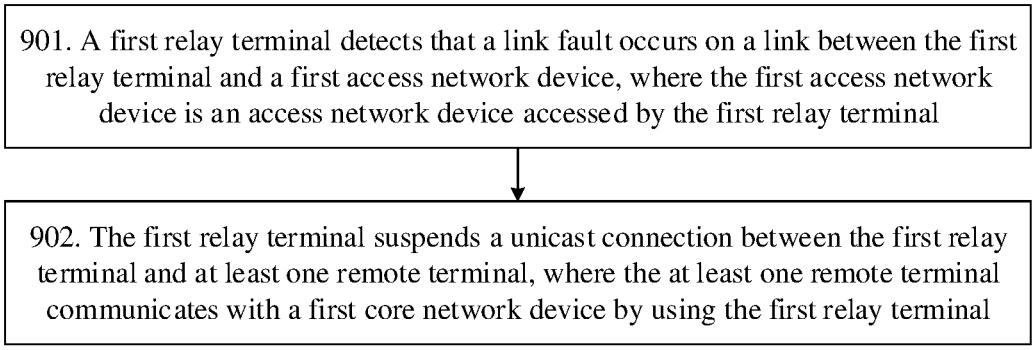

As shown in FIG. 9, the communication method provided in Solution 1.2 includes step 901 and step 902.

901. A first relay terminal detects that a link fault occurs on a link between the first relay terminal and a first access network device, where the first access network device is an access network device accessed by the first relay terminal. For descriptions related to step 901, refer to step 601. Details are not described again.

902. The first relay terminal suspends a unicast connection between the first relay terminal and at least one remote terminal, where the at least one remote terminal communicates with a first core network device by using the first relay terminal.

The at least one remote terminal may be all remote terminals connected to the first relay terminal, or may be some remote terminals connected to the first relay terminal. This is not limited in this application. If the at least one remote terminal is some remote terminals, the first relay terminal may release unicast connections between the first relay terminal and some remote terminals, and suspend unicast connections between the first relay terminal and the other some remote terminals.

That the first relay terminal suspends the unicast connections between the first relay terminal and the remote terminals means that the first relay terminal does not send and/or receive data on the unicast connections. Optionally, before or after step 902, the first relay terminal may continue to send, to the remote terminal, a data packet of the remote terminal previously received from the first core network device.

When the link fault occurs on the link between the first relay terminal and the first access network device, data transmission is interrupted, and the first relay terminal cannot help the remote terminal forward data. However, because the first relay terminal can subsequently perform RRC reestablishment of a Uu interface, that is, a relay service for the remote terminal can be recovered, when detecting that the link fault occurs on the link between the first relay terminal and the first access network device, the first relay terminal may first suspend the unicast connection that is established between the first relay terminal and the at least one remote terminal for a relay.

Optionally, after step 901, the method further includes step 903 and step 904.

903. The first relay terminal sends, to the at least one remote terminal, a message for suspending the unicast connection, where the message includes first indication information, and the first indication information indicates that a cause for suspending the unicast connection is that the link fault occurs on the link between the first relay terminal and the first access network device. Correspondingly, the remote terminal receives, from the first relay terminal, the message for suspending the unicast connection.

For example, the first indication information may be carried in an RRC message on a PC5 interface, or carried in PC5-S signaling on a PC5 interface. Alternatively, the first indication information may not be carried in the message for suspending the unicast connection, but is carried in another message. In addition, the first relay terminal may not send the first indication information to the remote terminal, but only indicate the remote terminal to suspend the unicast connection.

904. The remote terminal suspends the unicast connection between the remote terminal and the first relay terminal based on the message for suspending the unicast connection.

The remote terminal that receives the message for suspending the unicast connection may be any one of the at least one remote terminal. That the remote terminal suspends the unicast connection between the remote terminal and the first relay terminal means that the remote terminal does not send and/or receive data on the unicast connection.

After step 904, the remote terminal may determine, based on the received first indication information, an action to be subsequently performed. For example, to meet a requirement of subsequent communication, the remote terminal determines whether to perform relay terminal reselection.

Optionally, before step 902, the method further includes step 901-A.

901-A. The first relay terminal selects a processing manner for the link between the first relay terminal and the at least one remote terminal, where the processing manner includes: releasing the unicast connection, and suspending the unicast connection. In this case, during specific implementation, step 902 may include: If the processing manner selected by the first relay terminal is suspending the unicast connection, the first relay terminal suspends the unicast connection between the first relay terminal and the at least one remote terminal. Alternatively, if the processing manner selected by the first relay terminal is releasing the unicast connection, refer to Solution 1.1 for subsequent processing.

Optionally, after step 901, the method further includes step 905 and step 906.

905. The first relay terminal performs cell reselection.

The first relay terminal may camp on a new cell through cell reselection.

906. The first relay terminal performs RRC reestablishment in the reselected cell with a second access network device that provides the cell.

For a process in which the first relay terminal performs RRC reestablishment, refer to the foregoing descriptions of the RRC reestablishment process. Details are not described again.

In Solution 1.2, when detecting that the link fault occurs on the link between the first relay terminal and the first access network device, the first relay terminal suspends the unicast connection between the first relay terminal and the at least one remote terminal, but the unicast connection needs to be subsequently recovered. Therefore, the first relay terminal does not need to request a second core network device (for example, an AMF) to release a user plane connection that is established by the first relay terminal for the remote terminal and the first core network device.

There is no execution sequence between step 905 and step 902.

Optionally, if RRC reestablishment between the first relay terminal and the second access network device succeeds, after step 906, the method further includes step 907 and step 908.

907. The first relay terminal separately sends third indication information to the at least one remote terminal, where the third indication information sent to one remote terminal indicates to recover a unicast connection between the first relay terminal and the remote terminal. Correspondingly, the remote terminal receives the third indication information from the first relay terminal.

908. The remote terminal recovers the unicast connection between the remote terminal and the first relay terminal based on the third indication information.

It may be understood that, if RRC reestablishment between the first relay terminal and the second access network device succeeds, the user plane connection that is established by the first relay terminal for the remote terminal and the first core network device may be recovered. Therefore, the first relay terminal may indicate the remote terminal to recover the unicast connection.

Optionally, if RRC reestablishment between the first relay terminal and the second access network device fails, after step 906, the method further includes step 909 and step 910.

909. The first relay terminal separately sends fourth indication information to the at least one remote terminal, where the fourth indication information sent to one remote terminal indicates to release a unicast connection between the first relay terminal and the remote terminal. Correspondingly, the remote terminal receives the fourth indication information from the first relay terminal.

910. The remote terminal releases the unicast connection between the remote terminal and the first relay terminal based on the fourth indication information.

It may be understood that, if RRC reestablishment between the first relay terminal and the second access network device fails, the user plane connection that is established by the first relay terminal for the remote terminal and the first core network device cannot be recovered. In this case, the first relay terminal may indicate the remote terminal to release the unicast connection. After releasing the unicast connection, the remote terminal may perform an operation such as relay terminal reselection. For details, refer to an action performed by the remote terminal after the remote terminal releases the unicast connection in Solution 1.1. Details are not described again.

In Solution 1.2, suspending the unicast connection by the relay terminal is equivalent to performing RRC reestablishment by the relay terminal together with the remote terminal, so that a relay service can be quickly recovered.

Figure 10:
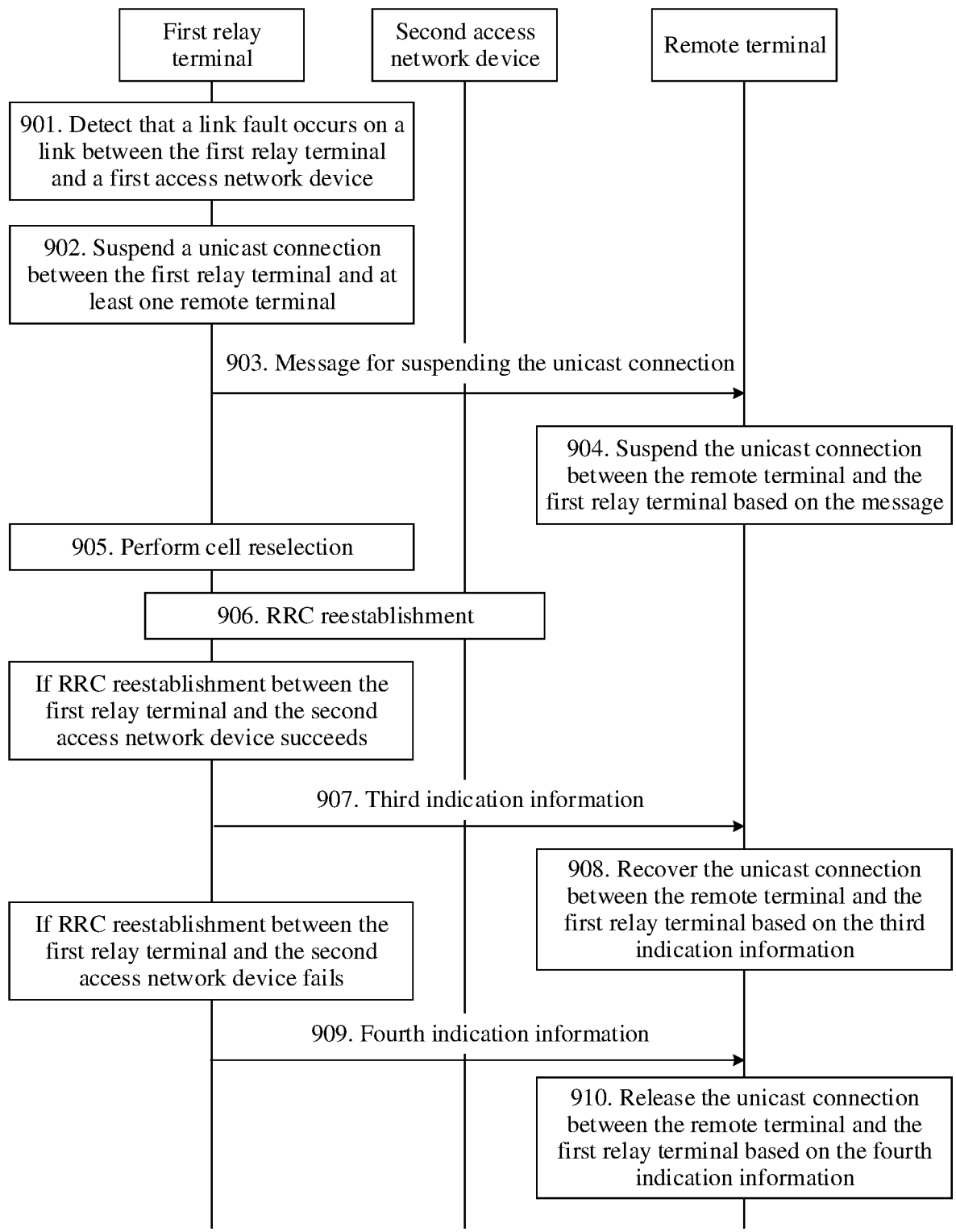
Figure 11:
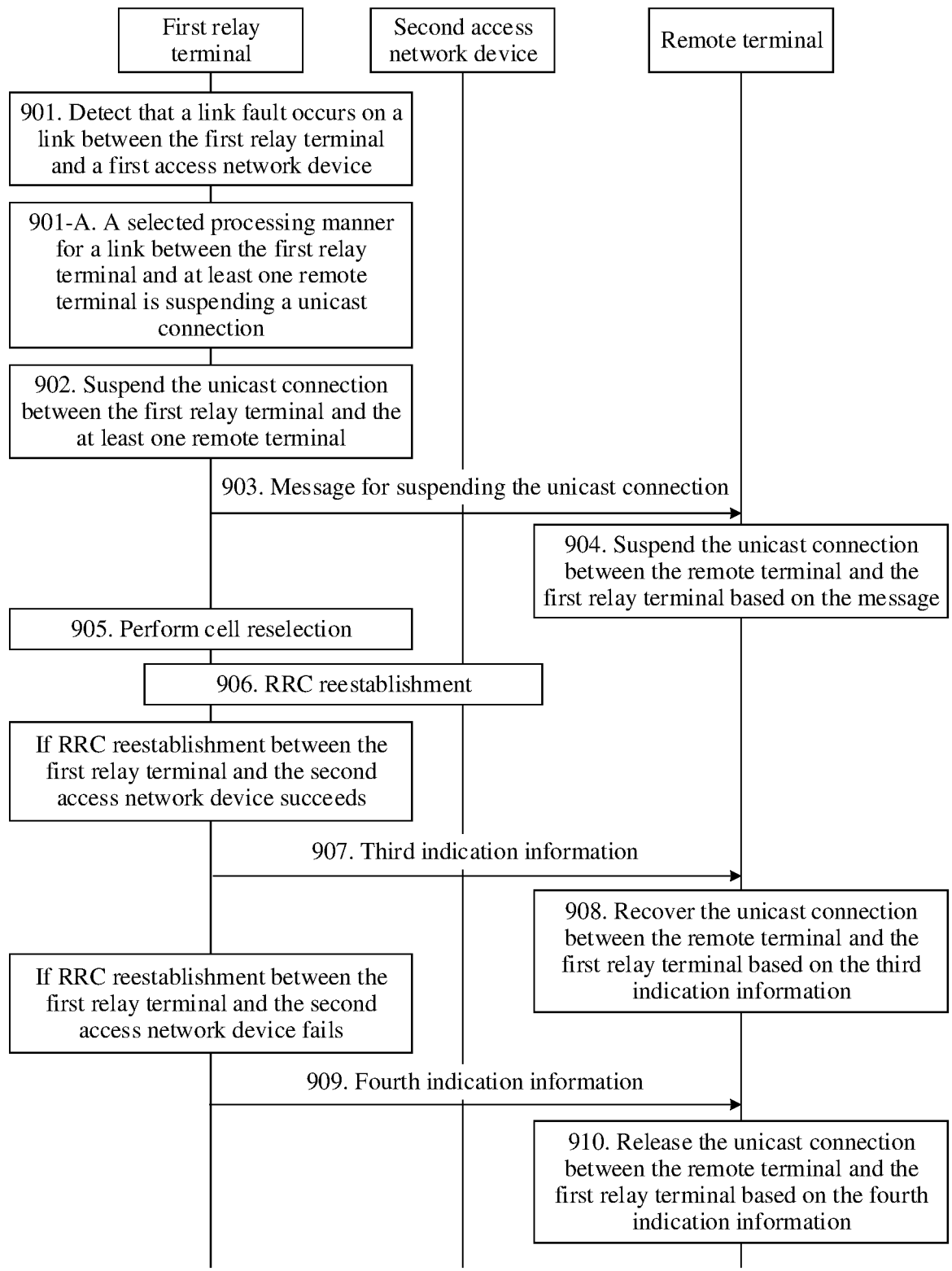

For clearer understanding of Solution 1.2, FIG. 10 and FIG. 11 each show an implementation procedure of Solution 1.2. Step numbers in the figures are drawn based on step numbers in Solution 1.2. For understanding of the steps, refer to the steps in Solution 1.1. However, this does not limit the implementation procedure of Solution 1.2. The implementation procedure of Solution 1.2 may alternatively have more or less steps than those in the figure, or may have steps different from those in the figure.

Figure 12:
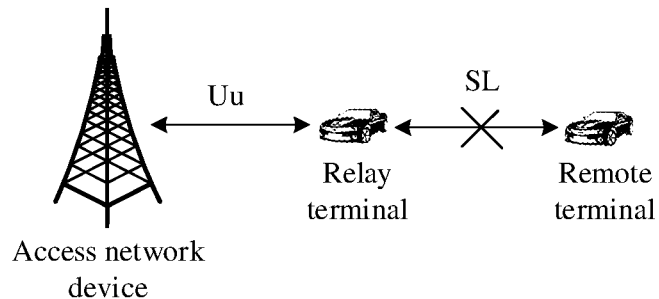
FIG. 12 is a schematic diagram of a link fault according to an embodiment of this application.

Scenario 2: A link fault occurs on a link between the relay terminal and the remote terminal (for example, as shown in FIG. 12), and the link fault is detected by the relay terminal.

Figure 13:
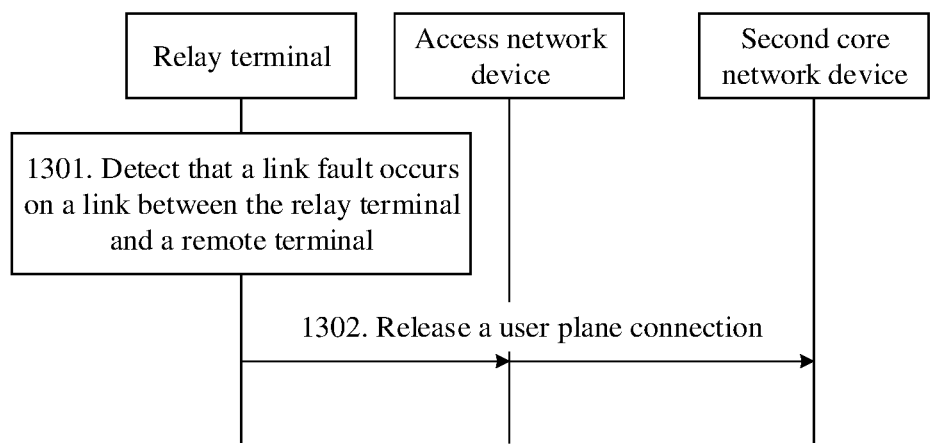

As shown in FIG. 13, the communication method in Scenario 2 includes step 1301 and step 1302.

1301. When a relay terminal detects that a link fault occurs on a link between the relay terminal and a remote terminal, the remote terminal communicates with a first core network device (for example, a UPF) by using the relay terminal.

It is the same case with step 601. For an RLF, the relay terminal may determine, based on a quantity of RLC retransmissions and an IS/OoS indication, whether the RLF occurs on the link between the relay terminal and the remote terminal. For example, if the quantity of RLC retransmissions performed by the relay terminal on the link reaches a maximum quantity of RLC retransmissions, it is considered that an RLF occurs on the link. For another example, if the relay terminal receives a preset quantity of consecutive OoS indications on the link within a preset time period, it is considered that an RLF occurs on the link.

1302. The relay terminal requests, by using an access network device, a second core network device (for example, an AMF) to release a user plane connection, where the user plane connection is established by the relay terminal for the remote terminal, and the access network device is an access network device accessed by the relay terminal.

Specifically, the relay terminal may trigger NAS signaling, to indicate the second core network device to release a PDU session or a QoS flow that is established by the relay terminal for the remote terminal.

When the relay terminal detects that the link fault occurs on the link between the relay terminal and the remote terminal, the relay terminal releases the unicast connection between the relay terminal and the remote terminal according to the current technologies. Step 1302 may be performed after or before the relay terminal releases the unicast connection between the relay terminal and the remote terminal.

It should be noted that the method shown in FIG. 13 may also be performed in a scenario in which the relay terminal receives a unicast connection release request sent by the remote terminal.

Scenario 3: A link fault occurs on a link between the relay terminal and the remote terminal (for example, as shown in FIG. 12), and the link fault is detected by the remote terminal.

Figure 14:
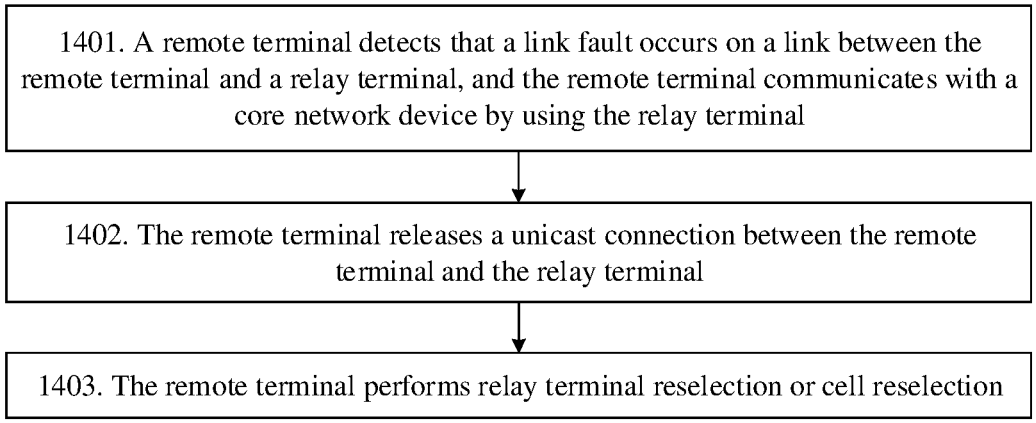

As shown in FIG. 14, the communication method in Scenario 3 includes step 1401 and step 1402.

1401. When a remote terminal detects that a link fault occurs on a link between the remote terminal and a relay terminal, the remote terminal communicates with a core network device (for example, a UPF) by using the relay terminal.

It is the same case with step 601. For an RLF, the remote terminal may determine, based on a quantity of RLC retransmissions and an IS/OoS indication, whether the RLF occurs on the link between the remote terminal and the relay terminal. For example, if the quantity of RLC retransmissions performed by the remote terminal on the link reaches a maximum quantity of RLC retransmissions, it is considered that an RLF occurs on the link. For another example, if the remote terminal receives a preset quantity of consecutive OoS indications on the link within a preset time period, it is considered that an RLF occurs on the link.

For a configuration failure, if the remote terminal receives configuration information of the relay terminal, and finds that the remote terminal cannot be matched with the configuration information of the relay terminal, the remote terminal considers that the configuration fails.

1402. The remote terminal releases a unicast connection between the remote terminal and the relay terminal.

1403. The remote terminal performs relay terminal reselection or cell reselection.

Through relay terminal reselection, the remote terminal may reselect a relay terminal to provide a relay service for the remote terminal (that is, the remote terminal communicates with the core network device by using the relay terminal). Through cell reselection, the remote terminal may camp on a cell again, and directly communicate with the access network device in the cell.

For example, the remote terminal may determine, based on a current condition of the remote terminal, whether to perform relay terminal reselection or cell reselection. Specifically, if the remote terminal currently still meets a condition for serving as a remote terminal, the remote terminal performs relay terminal reselection; otherwise, the remote terminal performs cell reselection. Specifically, the condition for serving as a remote terminal may be that an obtained cell measurement result is less than, or less than or equal to a threshold. The cell may be a serving cell of the remote terminal, or a cell with best signals that can be measured by the remote terminal.

When the remote terminal detects that the link fault occurs on the link between the remote terminal and the relay terminal, the remote terminal releases the unicast connection between the remote terminal and the relay terminal according to the current technologies. In this embodiment of this application, the remote terminal further triggers relay terminal reselection or cell reselection, so that the remote terminal re-initiates a service.

In the method provided in Embodiment 1, in the L3 relay UE-to-Network relay architecture, after the relay terminal detects that a link fault occurs on a link of a Uu interface or a PC5 interface or after the remote terminal detects that a link fault occurs on a link of a PC5 interface, processing on a relay service may be triggered to avoid a loss of service data of the remote terminal.

Embodiment 2

Applicable system and system architecture: an L2 relay UE-to-Network relay system and the system architecture shown in FIG. 2.

In the L2 relay UE-to-Network relay system, the remote terminal establishes a connection to the access network device and a core network device by using the relay terminal. In this case, the access network device may learn of a connection relationship between the relay terminal and the remote terminal. Specifically, the remote terminal may establish an RRC connection to the access network device by using the relay terminal, or may establish a user plane connection to the access network device by using the relay terminal.

Similar to Embodiment 1, the communication method provided in Embodiment 2 is also separately described in Scenario 1 to Scenario 3 below.

Scenario 1: A link fault occurs on a link between the relay terminal and the access network device (for example, as shown in FIG. 5), and the link fault is detected by the relay terminal.

In Scenario 1, the communication method provided in Embodiment 2 may include a communication method provided in Solution 2.1 and/or a communication method provided in Solution 2.2 below.

Solution 2.1

Figure 15:

As shown in FIG. 15, the communication method provided in Solution 2.1 includes step 1501 and step 1502.

1501. A first relay terminal detects that a link fault occurs on a link between the first relay terminal and a first access network device, where the first access network device is an access network device accessed by the first relay terminal. For descriptions related to step 1501, refer to step 601. Details are not described again.

1502. The first relay terminal releases a unicast connection between the first relay terminal and a remote terminal, where the remote terminal communicates with the first access network device by using the first relay terminal. For descriptions related to step 1502, refer to step 602. Details are not described again.

Optionally, before step 1502, the method further includes step 1501-A.

1501-A. The first relay terminal selects a processing manner for the link between the first relay terminal and the remote terminal, where the processing manner includes: releasing the unicast connection, and suspending the unicast connection. In this case, during specific implementation, step 1502 may include: If the processing manner selected by the first relay terminal is releasing the unicast connection, the first relay terminal releases the unicast connection between the first relay terminal and the remote terminal. Alternatively, if the processing manner selected by the first relay terminal is suspending the unicast connection, refer to Solution 2.2 for subsequent processing. For descriptions related to step 1501-A, refer to step 601-A. Details are not described again.

Optionally, the method further includes step 1503 and step 1504.

1503. The first relay terminal sends, to the remote terminal, a message for releasing the unicast connection, where the message includes first indication information, and the first indication information indicates that a cause for releasing the unicast connection is that the link fault occurs on the link between the first relay terminal and the first access network device. Correspondingly, the remote terminal receives, from the first relay terminal, the message for releasing the unicast connection. For descriptions related to step 1503, refer to step 607. Details are not described again.

1504. The remote terminal releases the unicast connection between the remote terminal and the first relay terminal based on the message. For descriptions related to step 1504, refer to step 608. Details are not described again.

Optionally, after step 1503 or step 1504, the method further includes step 1505.

1505. The remote terminal performs relay terminal reselection, and selects a second relay terminal. For descriptions related to step 1505, refer to step 609.

Optionally, after step 1505, the method further includes step 1506.

1506. The remote terminal performs RRC reestablishment with a third access network device by using the second relay terminal, where the third access network device is an access network device accessed by the second relay terminal.

For example, the third access network device and the first access network device may be a same access network device, or may be different access network devices. This is not limited in this application.

Optionally, during specific implementation, step 1506 includes: The remote terminal sends an RRC reestablishment request to the third access network device by using the second relay terminal, where the RRC reestablishment request carries information indicating a first cell and information indicating the remote terminal within a scope of the first cell, and the first cell is a cell in which the remote terminal is located before the remote terminal releases the unicast connection. Correspondingly, the third access network device receives the RRC reestablishment request from the first access network device.

For example, the information indicating the first cell may be a first cell identifier.

Optionally, the information indicating the remote terminal within the scope of the first cell is an identifier that uniquely identifies the remote terminal in the first cell, or an identifier of the first relay terminal and an identifier that uniquely identifies the remote terminal within a scope of the first relay terminal.

It should be noted that the RRC reestablishment request sent by the remote terminal needs to carry identification information of the remote terminal in the first access network device, so that the third access network device can find a context of the remote terminal in the first access network device. In the current technologies, a terminal carries a first cell identifier and a cell-radio network temporary identifier (cell-radio network temporary identifier, C-RNTI) that is allocated by the first access network device to the terminal and that can uniquely identify the terminal in the first cell. The C-RNTI is sent to the terminal by using a message 2 in a random access procedure. However, in the system architecture shown in FIG. 2, the remote terminal only needs to establish an RRC connection to the access network device by using a message 3 and a message 4 in the random access procedure, and does not need to exchange the message 1 and the message 2 with the access network device. Therefore, the access network device does not allocate the C-RNTI to the remote terminal.

However, an identifier that can uniquely identify the terminal in the first cell still needs to be allocated to the remote terminal, to identify the remote terminal. The identifier may be allocated by the first relay terminal, or may be allocated by the first access network device. In addition, different remote terminals may be distinguished by using different logical channels of the relay terminal.

In this embodiment of this application, when the remote terminal performs RRC reestablishment with the third access network device, if a terminal identifier can uniquely identify the remote terminal in the first cell, the RRC reestablishment request may carry the first cell identifier and the terminal identifier; if a terminal identifier can uniquely identify the remote terminal within the scope of the first relay terminal, the RRC reestablishment request may carry the identifier of the first relay terminal and the terminal identifier; or if different remote terminals are distinguished by using different logical channels of the relay terminal, the RRC reestablishment request may carry the first cell identifier, the identifier of the first relay terminal, and identifiers of the logical channels.

Based on a description related to step 1506, for a process in which the third access network device requests the context of the remote terminal from the first access network device, refer to step (11) and step (12) below.

(11) The third access network device sends a context request message to the first access network device, where the context request message is for requesting the context of the remote terminal, and the context request message includes the information indicating the first cell and the information indicating the remote terminal within the scope of the first cell. Correspondingly, the first access network device receives the context request message from the third access network device.

(12) The first access network device sends a context response message to the third access network device, where the context response message includes the context of the remote terminal. Correspondingly, the third access network device receives the context response message from the first access network device.

During specific implementation of step (12), the first access network device may determine the remote terminal based on the information indicating the first cell and the information indicating the remote terminal within the scope of the first cell that are included in the context request message, and then send the context of the remote terminal to the third access network device.

Figure 16:
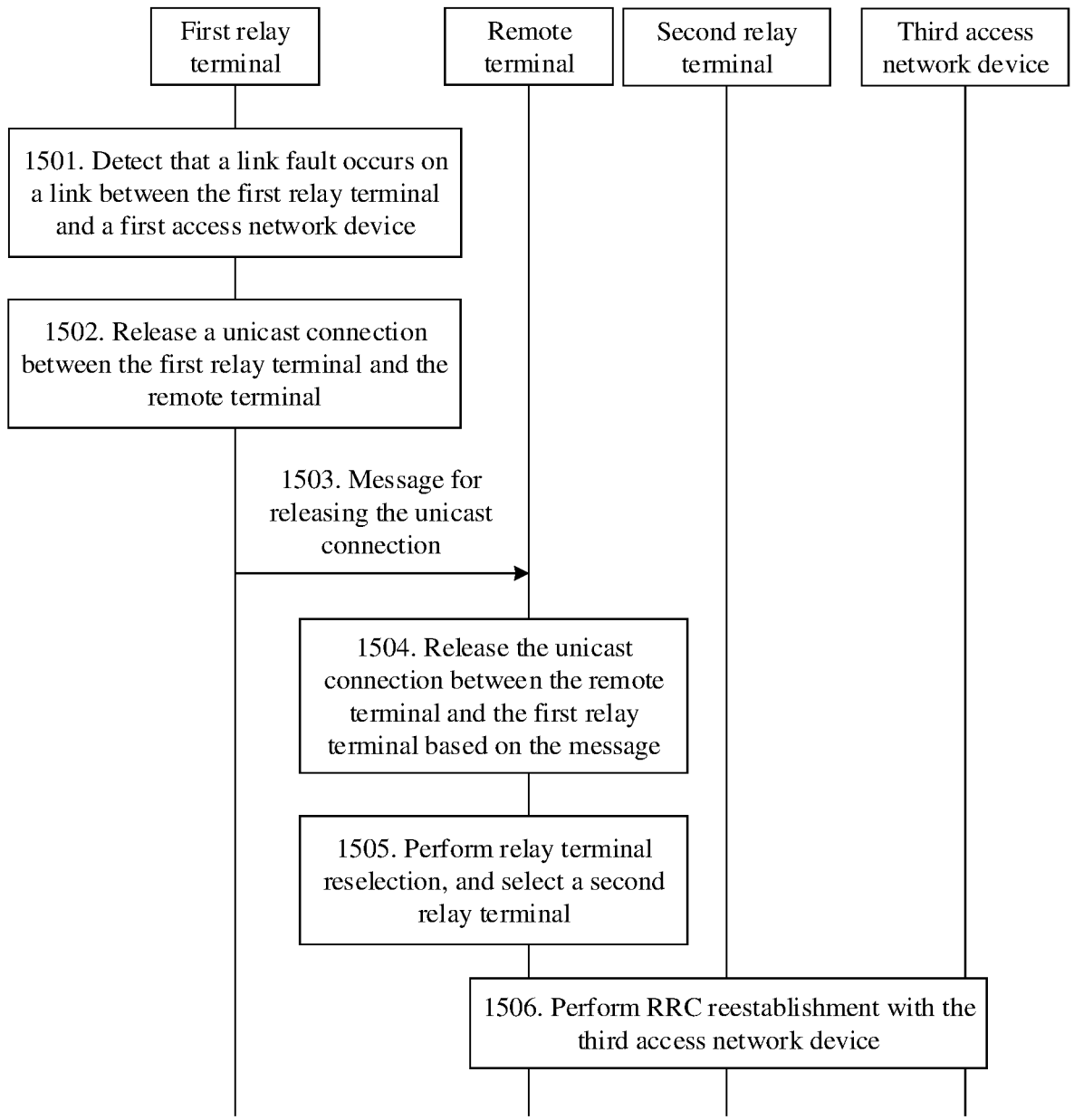
Figure 17:
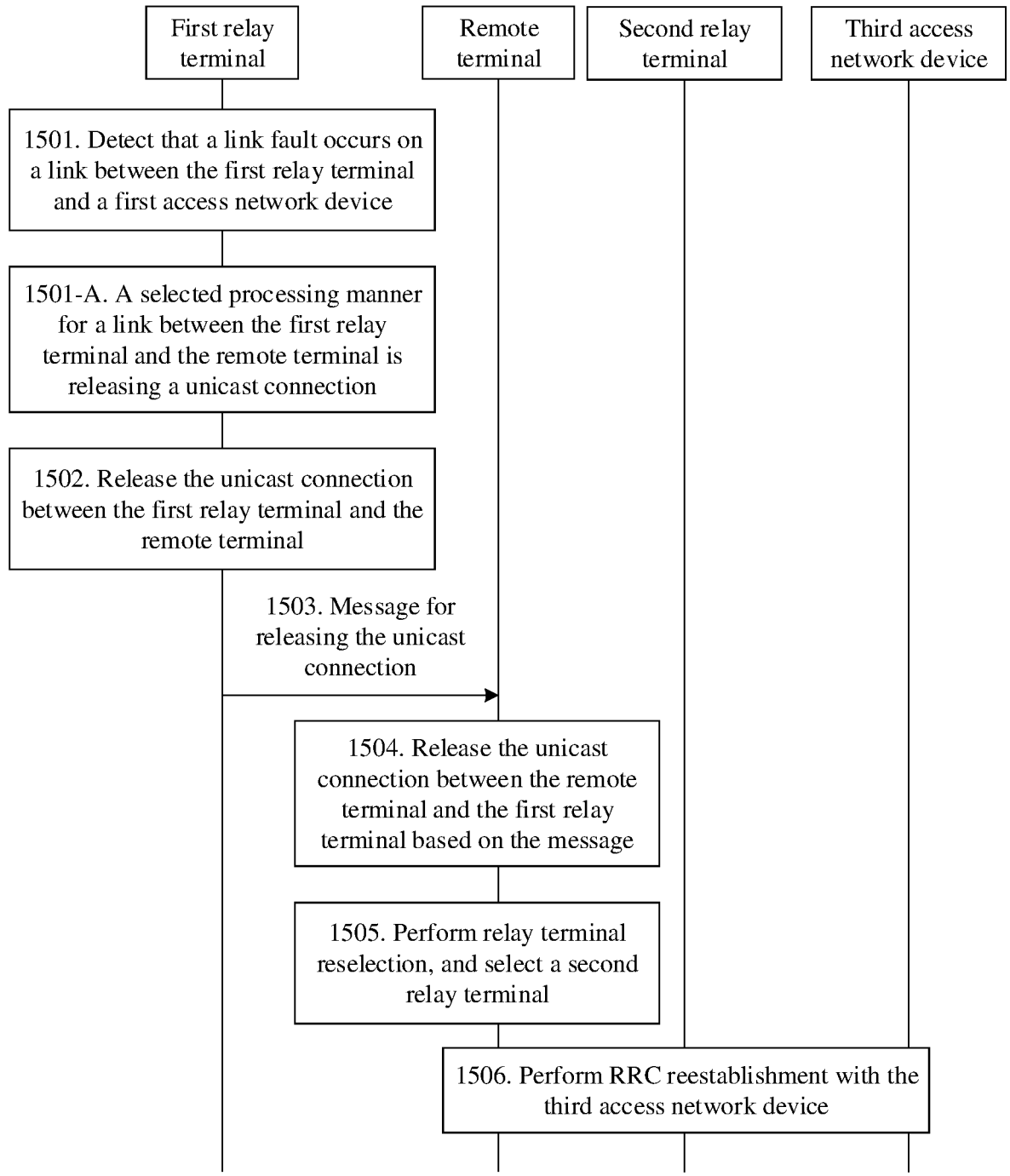

For clearer understanding of Solution 2.1, FIG. 16 and FIG. 17 each show an implementation procedure of Solution 2.1. Step numbers in the figures are drawn based on step numbers in Solution 2.1. For understanding of the steps, refer to the steps in Solution 2.1. However, this does not limit the implementation procedure of Solution 2.1. The implementation procedure of Solution 2.1 may alternatively have more or less steps than those in the figure, or may have steps different from those in the figure.

Solution 2.2

Figure 18:
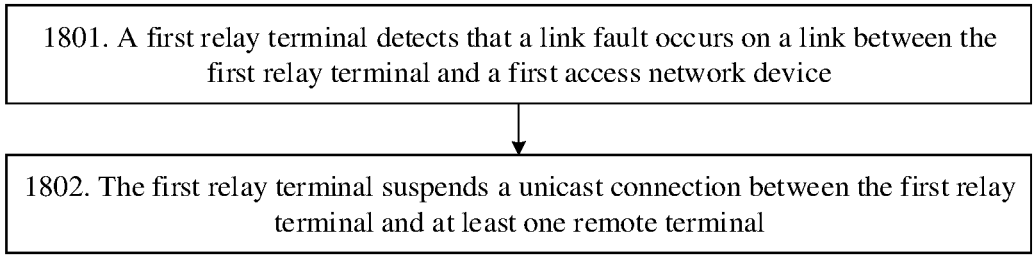

As shown in FIG. 18, Solution 2.2 provides a communication method, including the following steps.

1801. A first relay terminal detects that a link fault occurs on a link between the first relay terminal and a first access network device, where the first access network device is an access network device accessed by the first relay terminal. For descriptions related to step 1801, refer to step 601. Details are not described again.

1802. The first relay terminal suspends a unicast connection between the first relay terminal and at least one remote terminal, where the at least one remote terminal communicates with the first access network device by using the first relay terminal. For descriptions related to step 1802, refer to step 902. Details are not described again.

Optionally, after step 1801, the method further includes step 1803 and step 1804.

1803. The first relay terminal sends, to the at least one remote terminal, a message for suspending the unicast connection, where the message includes first indication information, and the first indication information indicates that a cause for suspending the unicast connection is that the link fault occurs on the link between the first relay terminal and the first access network device. Correspondingly, the remote terminal receives, from the first relay terminal, the message for suspending the unicast connection. For descriptions related to step 1803, refer to step 903. Details are not described again.

1804. The remote terminal suspends the unicast connection between the remote terminal and the first relay terminal based on the message for suspending the unicast connection. For descriptions related to step 1804, refer to step 904. Details are not described again.

Optionally, before step 1802, the method further includes step 1801-A.

1801-A. The first relay terminal selects a processing manner for the link between the first relay terminal and the at least one remote terminal, where the processing manner includes: releasing the unicast connection, and suspending the unicast connection. In this case, during specific implementation, step 1802 may include: If the processing manner selected by the first relay terminal is suspending the unicast connection, the first relay terminal suspends the unicast connection between the first relay terminal and the at least one remote terminal. Alternatively, if the processing manner selected by the first relay terminal is releasing the unicast connection, refer to Solution 2.1 for subsequent processing. For descriptions related to step 1801-A, refer to step 901-A. Details are not described again.

Optionally, after step 1801, the method further includes step 1805 and step 1806.

1805. The first relay terminal performs cell reselection. For descriptions related to step 1803, refer to step 903. Details are not described again.

1806. The first relay terminal sends an RRC reestablishment request to a second access network device. Correspondingly, the second access network device receives the RRC reestablishment request from the first relay terminal.

The second access network device is an access network device reselected by the first relay terminal.

Optionally, if RRC reestablishment between the first relay terminal and the second access network device succeeds, after step 1806, the method further includes step 1807 and step 1808.

1807. The first relay terminal separately sends third indication information to the at least one remote terminal, where the third indication information sent to one remote terminal indicates to recover a unicast connection between the first relay terminal and the remote terminal. Correspondingly, the remote terminal receives the third indication information from the first relay terminal. For descriptions related to step 1807, refer to step 907. Details are not described again.

1808. The remote terminal recovers the unicast connection between the remote terminal and the first relay terminal based on the third indication information. For descriptions related to step 1808, refer to step 908. Details are not described again.

Optionally, if RRC reestablishment between the first relay terminal and the second access network device fails, after step 1806, the method further includes step 1809 and step 1810.

1809. The first relay terminal separately sends fourth indication information to the at least one remote terminal, where the fourth indication information sent to one remote terminal indicates to release a unicast connection between the first relay terminal and the remote terminal. Correspondingly, the remote terminal receives the fourth indication information from the first relay terminal. For descriptions related to step 1809, refer to step 909. Details are not described again.

1810. The remote terminal releases the unicast connection between the remote terminal and the first relay terminal based on the fourth indication information. For descriptions related to step 1810, refer to step 910. Details are not described again.

After the first relay terminal accesses the second access network device through RRC reestablishment, the second access network device needs to request a context from the first access network device. In the current technologies, the second access network device obtains only a context of the first relay terminal. However, in this embodiment of this application, the second access network device may obtain the context of the first relay terminal and a context of the at least one remote terminal. For a specific process, refer to step (21) and step (22) below.

(21) The second access network device sends a context request message to the first access network device, where the context request message is for requesting the context of the first relay terminal and the context of the at least one remote terminal. Correspondingly, the first access network device receives the context request message from the second access network device.

(22) The first access network device sends a context response message to the second access network device, where the context response message includes the context of the first relay terminal and the context of the at least one remote terminal. Correspondingly, the second access network device receives the context response message from the first access network device.

The second access network device may obtain, by default, the context of the first relay terminal and contexts of all remote terminals connected to the first relay terminal. In this case, the context request message may include an identifier of the first relay terminal, but the context of the first relay terminal and the contexts of all the remote terminals connected to the first relay terminal may be obtained by using the context request message. The RRC reestablishment request indicates the second access network device to obtain the context of the first relay terminal and the context of the at least one remote terminal when obtaining a context from the first access network device. The at least one remote terminal herein is all the remote terminals connected to the first relay terminal.

Alternatively, the second access network device may obtain, as indicated by the indication information, the context of the first relay terminal and contexts of some or all remote terminals connected to the first relay terminal. In this case, the RRC reestablishment request includes second indication information, and the second indication information indicates the second access network device to obtain the context of the first relay terminal and the context of the at least one remote terminal when obtaining a context from the first access network device.

If the at least one remote terminal is some remote terminals connected to the first relay terminal, the second indication information may include an identifier of the at least one remote terminal, and the second access network device obtains the context of the first relay terminal and the context of the at least one remote terminal when obtaining a context from the first access network device. If the at least one remote terminal is all the remote terminals connected to the first relay terminal, the second indication information may be indicated by using one bit. For example, if a value of the bit is 1, when obtaining a context from the first access network device, the second access network device obtains the context of the first relay terminal and the contexts of all the remote terminals connected to the first relay terminal.

It may be understood that the first access network device stores the context of the first relay terminal and the context of the remote terminal. Because the first relay terminal suspends the unicast connection between the first relay terminal and the remote terminal, after RRC reestablishment is performed between the first relay terminal and the second access network device, which means the remote terminal accesses the second access network device together, the second access network device can obtain the context of the first relay terminal and the context of the remote terminal when obtaining a context, so that the context of the remote terminal can be quickly recovered, thereby reducing a service interruption delay of remote terminals.

It may be understood that one relay terminal may provide a relay service for a plurality of remote terminals, and some of the plurality of remote terminals may be unable to access the second access network device. In this case, the second access network device may obtain contexts of the some remote terminals. To enable the first relay terminal to know remote terminals that can access the second access network device, the second access network device may indicate, to the first relay terminal, information about the remote terminals that can access the second access network device. The first relay terminal sends, based on the information, a resume indication (namely, the third indication information) to the corresponding remote terminal, and sends a release indication (namely, the fourth indication information) to remote terminals that cannot access the second access network device.

In Solution 2.2, suspending the unicast connection by the relay terminal is equivalent to performing RRC reestablishment by the relay terminal together with the remote terminal, so that a relay service can be quickly recovered.

Figure 19:
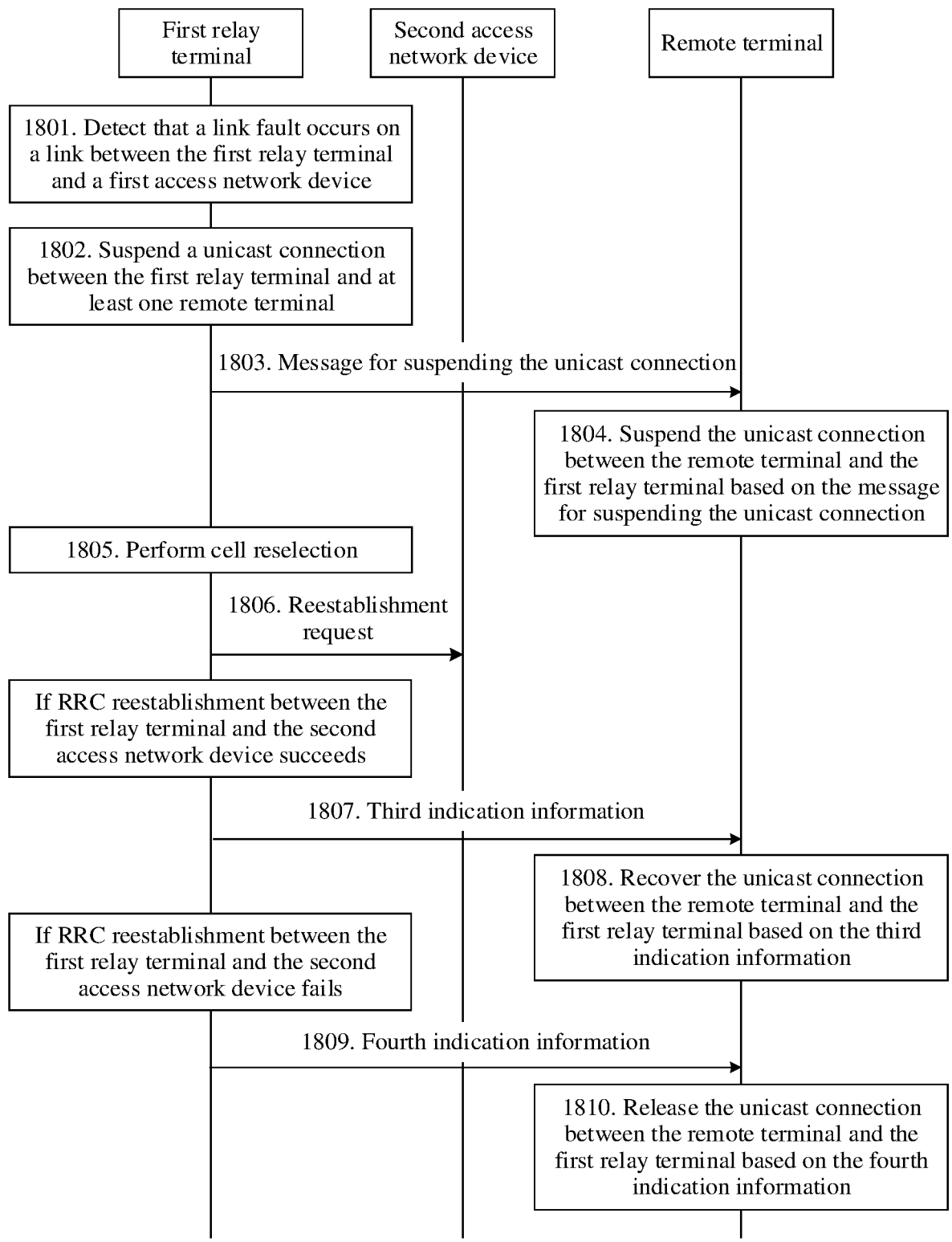
Figure 20:
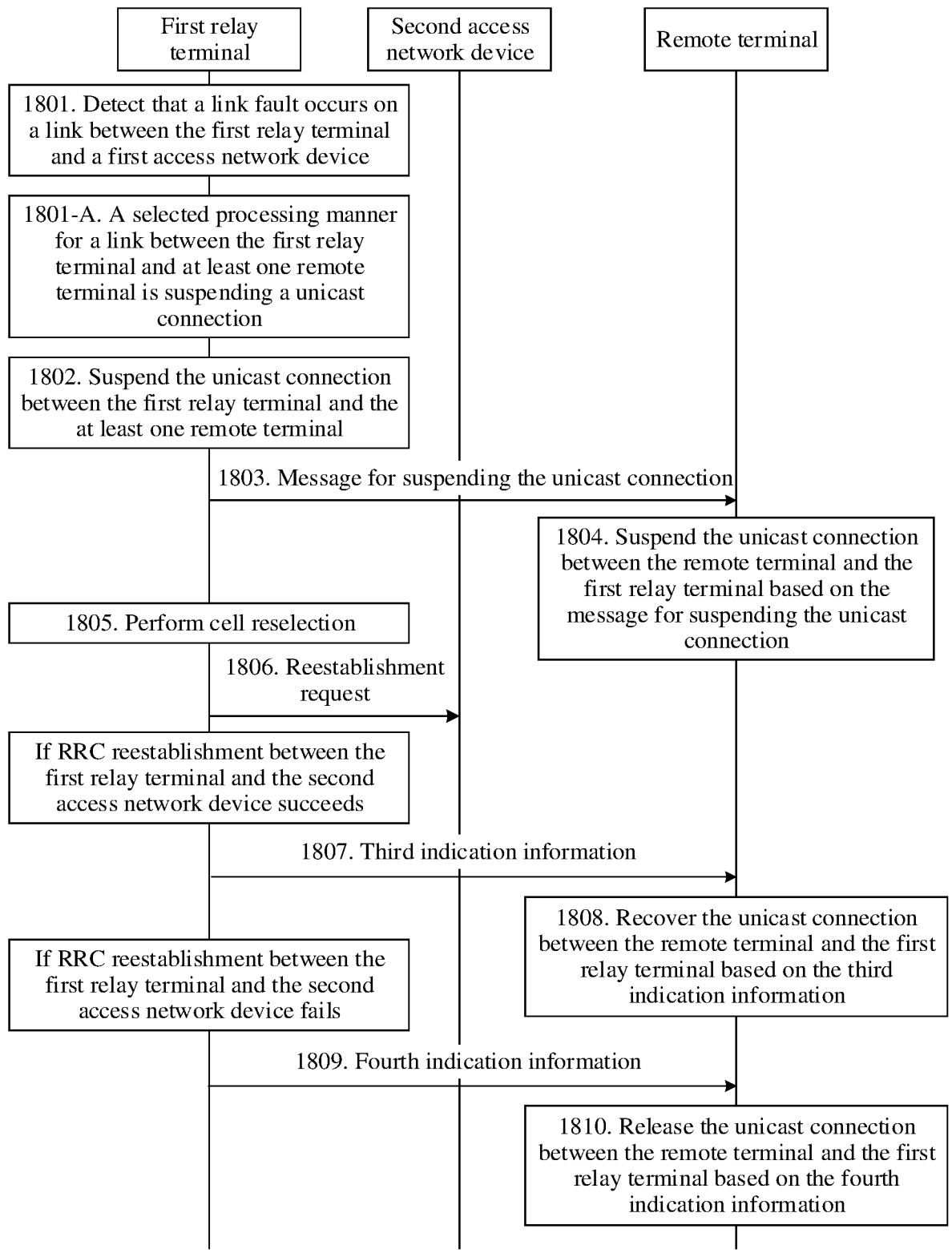

For clearer understanding of Solution 2.2, FIG. 19 and FIG. 20 each show an implementation procedure of Solution 2.2. Step numbers in the figures are drawn based on step numbers in Solution 2.2. For understanding of the steps, refer to the steps in Solution 2.2. However, this does not limit the implementation procedure of Solution 2.2. The implementation procedure of Solution 2.2 may alternatively have more or less steps than those in the figure, or may have steps different from those in the figure.

Scenario 2: A link fault occurs on a link between the relay terminal and the remote terminal (for example, as shown in FIG. 12), and the link fault is detected by the relay terminal.

In Scenario 2, in the current technologies, the relay terminal notifies the access network device that the relay terminal releases the unicast connection between the relay terminal and the remote terminal.

Optionally, the relay terminal implicitly indicates, by updating a destination identifier (destination ID) list that the relay terminal is interested in, that the relay terminal releases the unicast connection between the relay terminal and the remote terminal. That is, the relay terminal removes a destination identifier corresponding to the unicast connection between the relay terminal and the remote terminal from the destination identifier list that the relay terminal is interested in. In this case, the relay terminal may notify the access network device of a correspondence between the destination identifier corresponding to the unicast connection and the remote terminal. Based on this, the access network device can learn of a specific remote terminal that has a link fault on a link between the remote terminal and the relay terminal, so as to stop data/signaling transmission of the remote terminal.

Scenario 3: A link fault occurs on a link between the relay terminal and the remote terminal (for example, as shown in FIG. 12), and the link fault is detected by the remote terminal.

As shown in FIG. 21, the communication method in Scenario 3 includes the following steps.

2101. A remote terminal detects that a link fault occurs on a link between the remote terminal and a relay terminal, and the remote terminal communicates with a first access network device by using the relay terminal, where the first access network device is an access network device accessed by the relay terminal.

It is the same case with step 1401. For an RLF, the remote terminal may determine, based on a quantity of RLC retransmissions and an IS/OoS indication, whether the RLF occurs on the link between the remote terminal and the relay terminal. For example, if the quantity of RLC retransmissions performed by the remote terminal on the link reaches a maximum quantity of RLC retransmissions, it is considered that an RLF occurs on the link. For another example, if the remote terminal receives a preset quantity of consecutive OoS indications on the link within a preset time period, it is considered that an RLF occurs on the link.

For a configuration failure, if the remote terminal receives configuration information of the relay terminal, and finds that the remote terminal cannot be matched with the configuration information of the relay terminal, the remote terminal considers that the configuration fails. If the remote terminal receives configuration information that is configured by the first access network device for the remote terminal, but cannot perform a configuration in the configuration information, although the remote terminal can communicate with the relay terminal, the remote terminal cannot communicate with the first access network device, and still cannot complete normal data transmission. In this case, it may also be considered that the configuration fails.

2102. The remote terminal releases a unicast connection between the remote terminal and the relay terminal.

2103. The remote terminal performs relay terminal reselection or cell reselection, and selects a second access network device for RRC reestablishment.

For example, the remote terminal may determine, based on a current condition of the remote terminal, whether to perform relay terminal reselection or cell reselection. Specifically, if the remote terminal currently still meets a condition for serving as a remote terminal, the remote terminal performs relay terminal reselection; otherwise, the remote terminal performs cell reselection. Specifically, the condition for serving as a remote terminal may be that an obtained cell measurement result is less than, or less than or equal to a threshold. The cell may be a serving cell of the remote terminal, or a cell with best signals that can be measured by the remote terminal.

In Scenario 3, because there is a connection between the remote terminal and the first access network device, after releasing the unicast connection between the remote terminal and the relay terminal, the remote terminal may perform relay terminal reselection or cell reselection, and select the second access network device for RRC reestablishment. If the remote terminal performs relay terminal reselection, the remote terminal may select another relay terminal, and perform RRC reestablishment with the access network device (in this case, the access network device is the second access network device) accessed by the relay terminal. If the remote terminal performs cell reselection, after reselecting a cell, the remote terminal selects an access network device (in this case, the access network device is the second access network device) that provides the cell to perform RRC reestablishment.

In Scenario 3, if the link fault means that the first access network device fails to configure the remote terminal, the remote terminal may not release the unicast connection between the remote terminal and the relay terminal, but sends notification information (used for notifying that the link fault occurs on the link between the remote terminal and the relay terminal) to the relay terminal by using an RRC message on a sidelink. The relay terminal notifies the first access network device of the notification information by using an RRC message on a Uu interface. The first access network device updates the configuration of the remote terminal or reconfigures the remote terminal based on the notification information.

In the method provided in Embodiment 2, in the L2 relay UE-to-Network relay architecture, after the relay terminal detects that a link fault occurs on a link of a Uu interface or a PC5 interface or after the remote terminal detects that a link fault occurs on a link of a PC5 interface, processing on a relay service may be triggered to avoid a loss of service data of the remote terminal. Specifically, the relay terminal performs RRC reestablishment together with the remote terminal, or triggers the remote terminal to perform RRC reestablishment, so that a context of the remote terminal is quickly recovered, thereby reducing a service interruption delay of the remote terminal.

Embodiment 3

Applicable system and system architecture: an L2 relay UE-to-Network relay system and the system architecture shown in FIG. 3.

In the architecture shown in FIG. 3, the remote terminal may communicate with the access network device through a first path and a second path. The first path is a data transmission path used when the access network device directly communicates with the remote terminal. The second path is a data transmission path used when the remote terminal communicates with the access network device by using the relay terminal.

In the system architecture shown in FIG. 3, the communication method provided in Embodiment 3 varies in different scenarios. The following separately describes the communication method in Scenario 1 to Scenario 3.

Scenario 1: A link fault occurs on a link between the relay terminal and the access network device (for example, as shown in FIG. 22), and the link fault is detected by the relay terminal.

Figure 23:
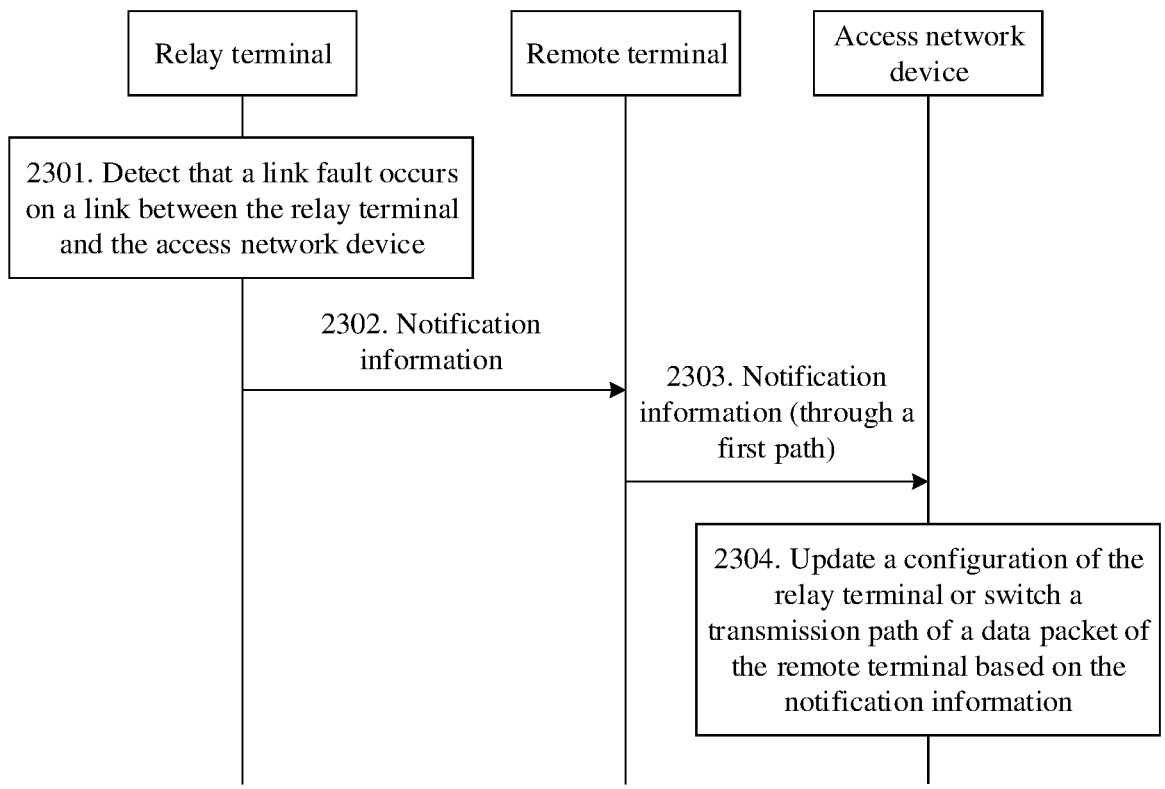
FIG. 23 is a flowchart of a communication method according to an embodiment of this application.

As shown in FIG. 23, the communication method in Scenario 1 includes the following steps.

2301. A relay terminal detects that a link fault occurs on a link between the relay terminal and an access network device, where the access network device is an access network device accessed by the relay terminal. For descriptions related to step 2301, refer to step 601. Details are not described again.

2302. The relay terminal sends notification information to a remote terminal, where the notification information is for notifying the remote terminal that the link fault occurs on the link between the relay terminal and the access network device. Correspondingly, the remote terminal receives the notification information from the relay terminal.

Optionally, the notification information further distinguishes whether an RLF or a configuration failure occurs.

For example, the notification information may indicate, by using a value of one bit, whether the link fault occurs on the link between the relay terminal and the access network device. For example, when the value of the bit is 1, it indicates that the link fault occurs on the link between the relay terminal and the access network device.

For example, in this case, the relay terminal may release a unicast connection between the relay terminal and the remote terminal, and the notification information is carried by using a message for releasing the unicast connection.

2303. The remote terminal sends the notification information to the access network device through a first path. Correspondingly, the access network device receives the notification information.

It may be understood that after the link fault occurs on the link between the relay terminal and the access network device, because a link between the relay terminal and the remote terminal and the first path can still be used for normal communication, the relay terminal may send the notification information to the remote terminal by using the link between the relay terminal and the remote terminal, and then the remote terminal sends the notification information to the access network device through the first path, so that the access network device performs corresponding processing.

2304. The access network device reconfigures the remote terminal and/or the relay terminal based on the notification information.

During specific implementation of step 2304, the access network device may recover the link between the access network device and the relay terminal by reconfiguring the remote terminal and/or the relay terminal, or may switch a transmission path of a data packet of the remote terminal from a second path to the first path by reconfiguring the remote terminal and/or the relay terminal, to implement normal communication of the remote terminal.

It should be noted that when the remote terminal communicates with the access network device through the first path and the second path, different identifiers may be used. An identifier used when the remote terminal communicates with the access network device by using the relay terminal may be denoted as a first identifier (for example, an index), and an identifier used when the remote terminal directly communicates with the access network device may be denoted as a second identifier (for example, a C-RNTI). To enable the access network device to learn that the first path and the second path correspond to a same remote terminal, the access network device needs to learn a correspondence between the first identifier and the second identifier. In this case, optionally, the method further includes the following steps:

(31) The remote terminal sends the first identifier to the access network device through the first path. Correspondingly, the access network device receives the first identifier from the remote terminal through the first path.

(32) The access network device determines, based on the first identifier, that a terminal corresponding to the first identifier and a terminal corresponding to the second identifier are a same terminal.

There is no strict sequence between the actions of step (31) and step (32) and the actions of step 2301 to step 2304. In other words, the remote terminal may report the first identifier through the first path before step 2301, may report both the first identifier and the notification information to the access network device, or may report the first identifier after reporting the notification information. This is not limited in this application.

It should be noted that if the remote terminal reports the first identifier through the first path before step 2301, because no link fault occurs on the second path at this time, a method for determining, by the access network device, that the first identifier and the second identifier correspond to a same terminal may include step (41) and step (42) below in addition to step (31) and step (32).

(41) The remote terminal sends the second identifier to the access network device through the second path. Correspondingly, the access network device receives the second identifier from the remote terminal through the second path.

(42) The access network device determines, based on the second identifier, that a terminal corresponding to the second identifier and a terminal corresponding to the first identifier are a same terminal.

Figure 24:
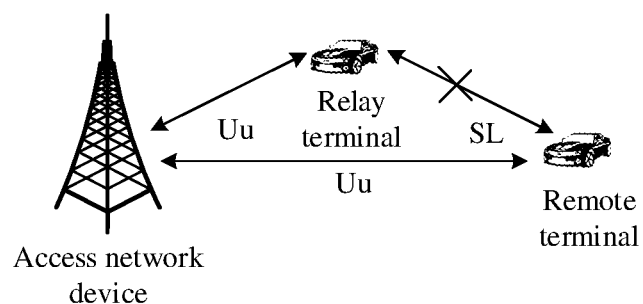
FIG. 24 is a schematic diagram of a link fault according to an embodiment of this application.

Scenario 2: A link fault occurs on a link between the relay terminal and the remote terminal (for example, as shown in FIG. 24), and the link fault is detected by the relay terminal or the remote terminal.

Figure 25:
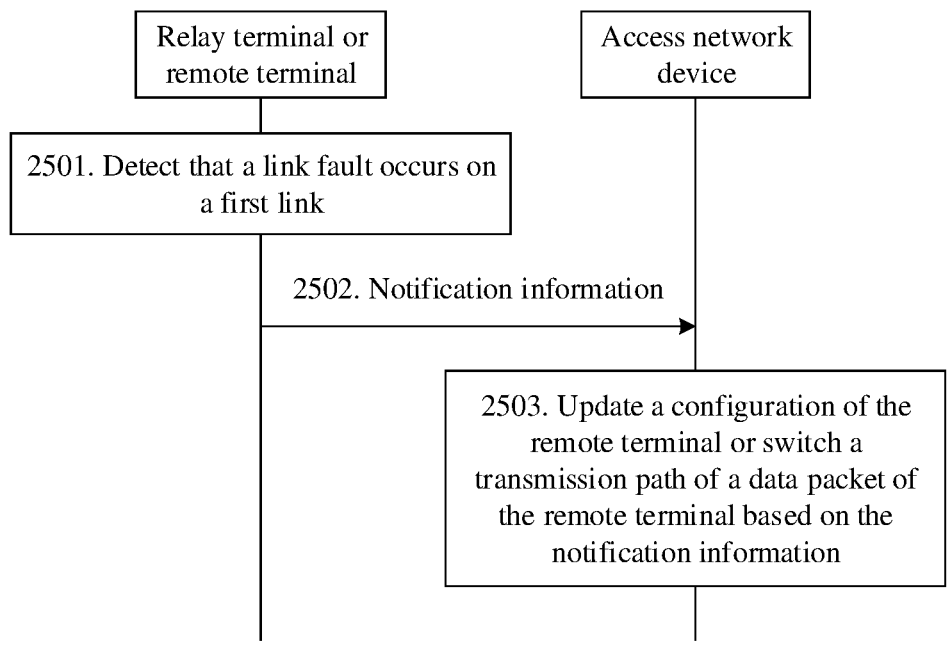
FIG. 25 is a flowchart of a communication method according to an embodiment of this application.

As shown in FIG. 25, the communication method in Scenario 2 includes the following steps.

2501. A terminal detects that a link fault occurs on a first link, where the terminal is a relay terminal or a remote terminal, and the first link is a link between the relay terminal and the remote terminal.

If the terminal is the relay terminal, for descriptions related to step 2501, refer to step 1301. If the terminal is the remote terminal, for descriptions related to step 2501, refer to step 2101.

2502. The terminal sends notification information to an access network device, where the notification information is for notifying the access network device that the link fault occurs on the first link. Correspondingly, the access network device receives the notification information.

Optionally, the notification information may further distinguish whether an RLF or a configuration failure occurs.

For example, the notification information may explicitly or implicitly indicate that the link fault occurs on the first link. For example, the notification information may indicate, by using a value of a bit, whether the link fault occurs on the first link. For example, when the value of the bit is 1, it indicates that a link fault occurs on a link between the relay terminal and the access network device. For another example, the relay terminal implicitly indicates, by updating a destination identifier (destination ID) list that the relay terminal is interested in, that the link fault occurs on the first link. That is, the relay terminal removes a destination identifier corresponding to the unicast connection between the relay terminal and the remote terminal from the destination identifier list that the relay terminal is interested in. In this case, the relay terminal may notify the access network device of a correspondence between the destination identifier corresponding to the unicast connection and the remote terminal. Based on this, the access network device can learn of a specific remote terminal that has a link fault on a link between the remote terminal and the relay terminal.

It may be understood that after the link fault occurs on the first link, because the link between the relay terminal and the access network device and a first path can still be used for normal communication, if the terminal is the relay terminal, the relay terminal may send the notification information to the access network device by using the link between the relay terminal and the access network device, or if the terminal is a remote terminal, the remote terminal may send the notification information to the access network device through the first path, so that the access network device performs corresponding processing.

2503. The access network device reconfigures the remote terminal and/or the relay terminal based on the notification information.

During specific implementation of step 2503, the access network device may recover the link between the remote terminal and the relay terminal by reconfiguring the remote terminal and/or the relay terminal, or may switch a transmission path of a data packet of the remote terminal from a second path to the first path by reconfiguring the remote terminal and/or the relay terminal, to implement normal communication of the remote terminal.

In Scenario 2, if the terminal is the remote terminal, and the link fault means that the access network device fails to configure the remote terminal, the remote terminal may not use the first path to send the notification information to the access network device, but use an RRC message on a sidelink to send the notification information to the relay terminal. The relay terminal notifies the access network device of the notification information by using an RRC message on a Uu interface. The access network device updates the configuration of the remote terminal or reconfigures the remote terminal based on the notification information.

Similar to Scenario 1, in Scenario 2, the access network device also needs to learn of a correspondence between a first identifier and a second identifier. Specifically, this may be implemented by using step (31) and step (32), or may be implemented by using step (41) and step (42). For details, refer to the foregoing descriptions. Details are not described again.

Figure 26:
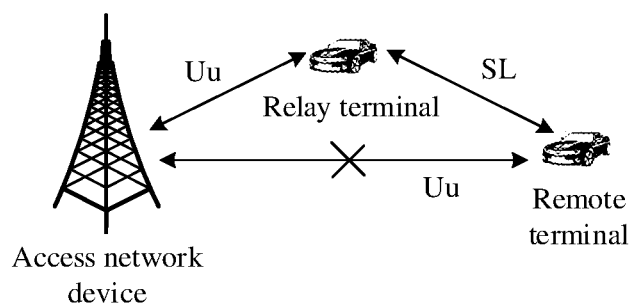
FIG. 26 is a schematic diagram of a link fault according to an embodiment of this application.

Scenario 3: A link fault occurs on a first path (for example, as shown in FIG. 26), and the link fault is detected by the remote terminal.

Figure 27:
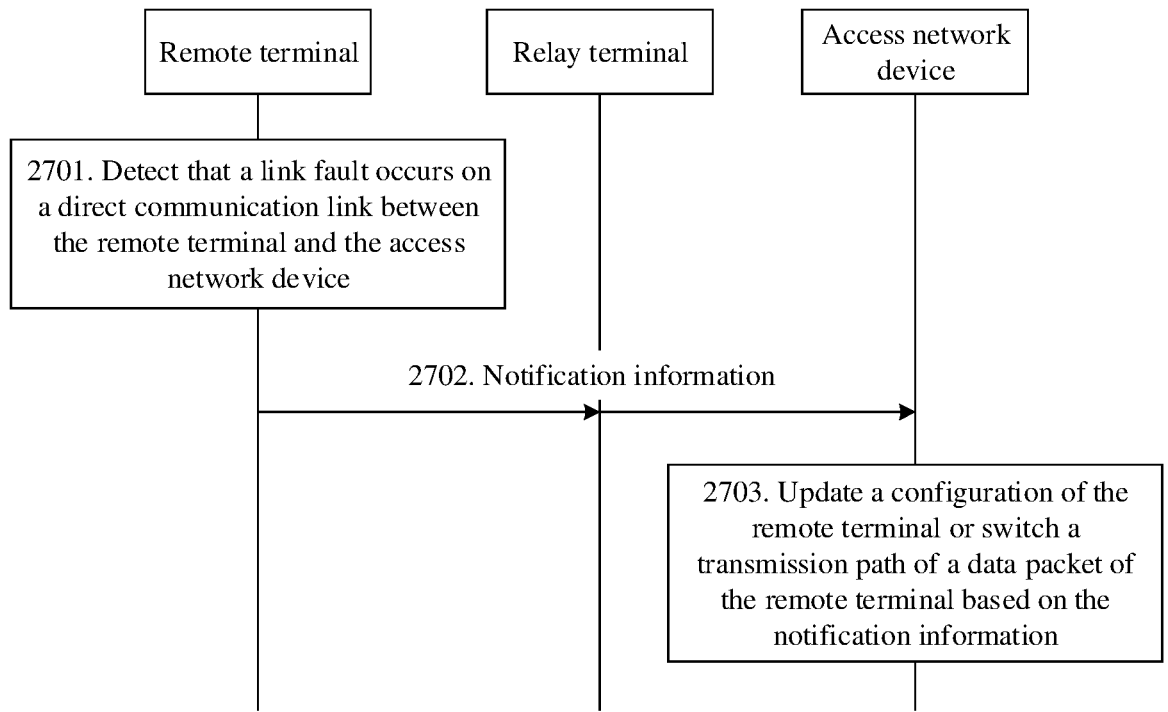
FIG. 27 is a flowchart of a communication method according to an embodiment of this application.

As shown in FIG. 27, the communication method in Scenario 3 includes the following steps.

2701. A remote terminal detects that a link fault occurs on a direct communication link between the remote terminal and an access network device.

For a specific implementation of step 2701, refer to step 601. A difference only lies in that the remote terminal is used herein.

2702. The remote terminal sends notification information to the access network device by using a relay terminal, where the notification information is for notifying the access network device that the link fault occurs on the direct communication link between the remote terminal and the access network device. Correspondingly, the access network device receives the notification information.

Optionally, the notification information may further distinguish whether an RLF or a configuration failure occurs.

2703. The access network device reconfigures the remote terminal and/or the relay terminal based on the notification information.

During specific implementation of step 2703, the access network device may recover the direct communication link between the access network device and the remote terminal by reconfiguring the remote terminal and/or the relay terminal, or may switch a transmission path of a data packet of the remote terminal from a first path to a second path by reconfiguring the remote terminal and/or the relay terminal, to implement normal communication of the remote terminal.

Similar to Scenario 1, in Scenario 3, the access network device also needs to learn of a correspondence between a first identifier and a second identifier. Specifically, this may be implemented by using step (31) and step (32), or may be implemented by using step (41) and step (42).

In Scenario 3, according to the current technologies, after the link fault occurs on the direct communication link between the remote terminal and the access network device, RRC reestablishment of the remote terminal is triggered. However, in this embodiment of this application, the second path in addition to the first path exists between the remote terminal and the access network device. Therefore, the remote terminal may send the notification information to the access network device through the second path, so that the access network device performs subsequent processing.

Upon comparison with Embodiment 2, in Embodiment 3, after detecting the link fault, the relay terminal or the remote terminal can quickly report information about the link fault to the access network device, so that the access network device can quickly make a response, thereby reducing a service interruption delay.

In the foregoing embodiments, a link of the remote terminal can be quickly recovered according to the method provided in both this embodiment of this application in the L2 relay UE-to-Network relay system and the L3 relay UE-to-Network relay system, and the service interruption delay can be reduced.

In the foregoing embodiments of this application, between two network elements (for example, the access network device and the relay terminal, or the relay terminal and the remote terminal), when a network element sends a message or a piece of information to another network element, the another network element may return a response to the message or the piece of information. For example, after step 903 or step 1803, the remote terminal may return, to the first relay terminal, a response to a message for suspending a connection. After step 907 or step 1807, the remote terminal may return, to the first relay terminal, a response to the third indication information. After step 909 or step 1809, the remote terminal may return, to the first relay terminal, a response to the fourth indication information. After step 1503, the remote terminal may return, to the first relay terminal, a response to a message for releasing a connection. For ease of description, these responses are omitted in this application. However, it may be understood that all these responses may exist.

The foregoing mainly describes the solutions in embodiments of this application from a perspective of interaction between network elements. It may be understood that to implement the foregoing functions, the network elements such as the relay terminal, the remote terminal, or the access network device, each include a corresponding hardware structure and/or a software module for performing each function. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the relay terminal, the remote terminal, and the access network device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, division into the units is an example, and is merely logical function division. During actual implementation, another division manner may be used.

Figure 28:
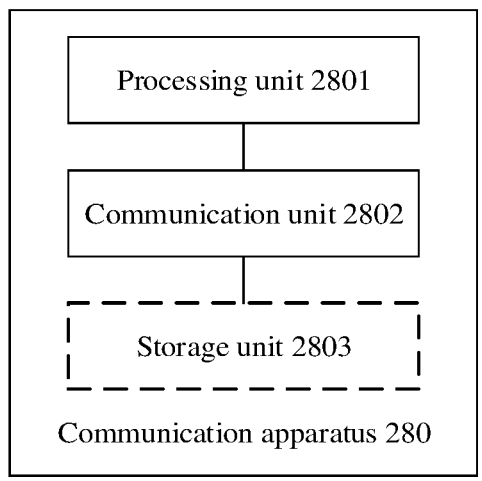
FIG. 28 is a schematic composition diagram of a communication apparatus according to an embodiment of this application.

When an integrated unit is used, FIG. 28 shows a communication apparatus 280 in the foregoing embodiments.

The communication apparatus 280 may include a processing unit 2801 and a communication unit 2802. Optionally, the communication apparatus 280 further includes a storage unit 2803. The schematic structural diagram shown in FIG. 28 may show structures of the relay terminal, the remote terminal, and the access network device in the foregoing embodiments.

When the schematic structural diagram shown in FIG. 28 shows the structure of the relay terminal in the foregoing embodiments, the processing unit 2801 is configured to control and manage actions of the relay terminal. For example, the processing unit 2801 is configured to support the relay terminal in performing steps 601 and 602 in FIG. 6 (where in this case, the relay terminal is the first relay terminal in the figure), performing steps 601, 605, 606, 602, 603, 604, and 607 in FIG. 7 (where in this case, the relay terminal is the first relay terminal in the figure), performing steps 601, 601-A, and 602 to 607 in FIG. 8 (where in this case, the relay terminal is the first relay terminal in the figure), performing steps 901 and 902 in FIG. 9 (where in this case, the relay terminal is the first relay terminal in the figure), performing steps 901 to 903, 905 to 907, and 909 in FIG. 10 (where in this case, the relay terminal is the first relay terminal in the figure), performing steps 901, 901-A, 902, 903, 905 to 907, and 909 in FIG. 11 (where in this case, the relay terminal is the first relay terminal in the figure), performing steps 1301 and 1302 in FIG. 13, performing steps 1501 and 1502 in FIG. 15 (where in this case, the relay terminal is the first relay terminal in the figure), performing steps 1501 to 1503 in FIG. 16 (where in this case, the relay terminal is the first relay terminal in the figure), performing step 1506 in FIG. 16 (where in this case, the relay terminal is the second relay terminal in the figure), performing steps 1501, 1501-A, 1502, and 1503 in FIG. 17 (where in this case, the relay terminal is the first relay terminal in the figure), performing step 1506 in FIG. 17 (where in this case, the relay terminal is the second relay terminal in the figure), performing steps 1801 and 1802 in FIG. 18 (where in this case, the relay terminal is the first relay terminal in the figure), performing steps 1801 to 1803, 1805 to 1807, and 1809 in FIG. 19 (where in this case, the relay terminal is the first relay terminal in the figure), performing steps 1801, 1801-A, 1802, 1803, 1805 to 1807, and 1809 in FIG. 20 (where in this case, the relay terminal is the first relay terminal in the figure), performing steps 2301 and 2302 in FIG. 23, performing steps 2501 and 2502 in FIG. 25, performing step 2702 in FIG. 27, and/or actions performed by the relay terminal in another process described in embodiments of this application. The processing unit 2801 may communicate with another network entity by using the communication unit 2802, for example, communicate with the remote terminal shown in FIG. 10. The storage unit 2803 is configured to store program code and data of the relay terminal.

When the schematic structural diagram shown in FIG. 28 shows the structure of the relay terminal in the foregoing embodiments, the communication apparatus 280 may be a device, or may be a chip in a device.

When the schematic structural diagram shown in FIG. 28 shows the structure of the remote terminal in the foregoing embodiments, the processing unit 2801 is configured to control and manage actions of the remote terminal. For example, the processing unit 2801 is configured to support the remote terminal in performing steps 607 to 609 in FIG. 7, performing steps 607 to 609 in FIG. 8, performing steps 903, 904, and 907 to 910 in FIG. 10, performing steps 903, 904, and 907 to 910 in FIG. 11, performing steps 1401 to 1403 in FIG. 14, performing steps 1503 to 1506 in FIG. 16, performing steps 1503 to 1506 in FIG. 17, performing steps 1803, 1804, and 1807 to 1810 in FIG. 19, performing steps 1803, 1804, and 1807 to 1810 in FIG. 20, performing steps 2101 to 2103 in FIG. 21, performing steps 2302 and 2303 in FIG. 23, performing steps 2501 and 2502 in FIG. 25, and performing steps 2701 and 2702 in FIG. 27, and/or actions performed by the remote terminal in another process described in embodiments of this application. The processing unit 2801 may communicate with another network entity by using the communication unit 2802, for example, communicate with the first relay terminal shown in FIG. 10. The storage unit 2803 is configured to store program code and data of the remote terminal.

When the schematic structural diagram shown in FIG. 28 shows the structure of the remote terminal in the foregoing embodiments, the communication apparatus 280 may be a device, or may be a chip in a device.

When the schematic structural diagram shown in FIG. 28 shows the structure of the access network device in the foregoing embodiments, the processing unit 2801 is configured to control and manage actions of the access network device. For example, the processing unit 2801 is configured to support the access network device in performing steps 605, 606, 604, and 607 in FIG. 7 (where in this case, the access network device is the second access network device in the figure), performing steps 604 to 606 in FIG. 8 (where in this case, the access network device is the second access network device in the figure), performing step 906 in FIG. 10 (where in this case, the access network device is the second access network device in the figure), performing step 906 in FIG. 11 (where in this case, the access network device is the second access network device in the figure), performing step 1302 in FIG. 13, performing step 1506 in FIG. 16 (where in this case, the access network device is the third access network device in the figure), performing step 1506 in FIG. 17 (where in this case, the access network device is the third access network device in the figure), performing step 1806 in FIG. 19 (where in this case, the access network device is the second access network device in the figure), performing step 1806 in FIG. 20 (where in this case, the access network device is the second access network device in the figure), performing steps 2303 and 2304 in FIG. 23, performing steps 2502 and 2503 in FIG. 25, performing steps 2702 and 2703 in FIG. 27, and/or actions performed by the access network device in another process described in embodiments of this application. The processing unit 2801 may communicate with another network entity by using the communication unit 2802, for example, communicate with the first relay terminal shown in FIG. 10. The storage unit 2803 is configured to store program code and data of the access network device.

When the schematic structural diagram shown in FIG. 28 shows the structure of the access network device in the foregoing embodiments, the communication apparatus 280 may be a device, or may be a chip in a device.

When an integrated unit in FIG. 28 is implemented in a form of a software functional module and sold or used as an independent product, the integrated unit may be stored in a computer-readable storage medium. Based on such an understanding, the technical solutions of embodiments of this application essentially, or the part contributing to a conventional technology, or all or a part of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

The units in FIG. 28 may also be referred to as modules. For example, the processing unit may be referred to as a processing module.

Figure 29:
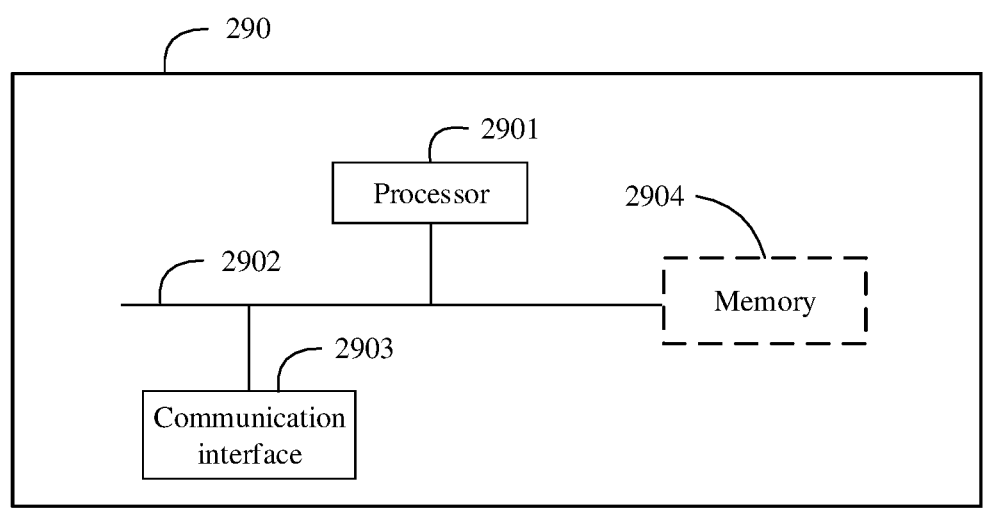
FIG. 29 is a schematic structural diagram of hardware of a communication apparatus according to an embodiment of this application.

FIG. 29 is a schematic structural diagram of hardware of a communication apparatus 290 according to an embodiment of this application. The communication apparatus 290 includes one or more processors 2901 and a communication interface 2903.

Optionally, the communication apparatus 290 further includes a memory 2904. The memory 2904 may include a read-only memory and a random access memory, and provide operation instructions and data for the processor 2901. A part of the memory 2904 may further include a non-volatile random access memory (NVRAM).

In this embodiment of this application, the communication apparatus 290 invokes the operation instructions stored in the memory 2904 (where the operation instructions may be stored in an operating system), to perform corresponding operations.

The processor 2901 may also be referred to as a central processing unit (CPU).

The processor 2901, the communication interface 2903, and the memory 2904 are coupled together by using a bus system 2902. The bus system 2902 may further include a power bus, a control bus, a status signal bus, and the like in addition to a data bus. However, for clarity of description, various buses are marked as the bus system 2902 in FIG. 29.

The methods disclosed in the foregoing embodiments of this application may be applied to the processor 2901, or may be implemented by the processor 2901. The processor 2901 may be an integrated circuit chip and has a signal processing capability. In an implementation process, the steps of the foregoing methods may be completed by using an integrated logic circuit of hardware in the processor 2901 or instructions in a form of software. The processor 2901 may be a general-purpose processor, a digital signal processor (digital signal processing, DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 2904, and the processor 2901 reads information in the memory 2904 and completes the steps in the foregoing methods in combination with hardware of the processor 2901.

For example, the schematic structural diagram shown in FIG. 29 may show structures of the relay terminal, the remote terminal, and the access network device in the foregoing embodiments.

When the schematic structural diagram shown in FIG. 29 shows the structure of the relay terminal in the foregoing embodiments, the processor 2901 is configured to control and manage actions of the relay terminal. For example, the processor 2901 is configured to support the relay terminal in performing steps 601 and 602 in FIG. 6 (where in this case, the relay terminal is the first relay terminal in the figure), performing steps 601, 605, 606, 602, 603, 604, and 607 in FIG. 7 (where in this case, the relay terminal is the first relay terminal in the figure), performing steps 601, 601-A, and 602 to 607 in FIG. 8 (where in this case, the relay terminal is the first relay terminal in the figure), performing steps 901 and 902 in FIG. 9 (where in this case, the relay terminal is the first relay terminal in the figure), performing steps 901 to 903, 905 to 907, and 909 in FIG. 10 (where in this case, the relay terminal is the first relay terminal in the figure), performing steps 901, 901-A, 902, 903, 905 to 907, and 909 in FIG. 11 (where in this case, the relay terminal is the first relay terminal in the figure), performing steps 1301 and 1302 in FIG. 13, performing steps 1501 and 1502 in FIG. 15 (where in this case, the relay terminal is the first relay terminal in the figure), performing steps 1501 to 1503 in FIG. 16 (where in this case, the relay terminal is the first relay terminal in the figure), performing step 1506 in FIG. 16 (where in this case, the relay terminal is the second relay terminal in the figure), performing steps 1501, 1501-A, 1502, and 1503 in FIG. 17 (where in this case, the relay terminal is the first relay terminal in the figure), performing step 1506 in FIG. 17 (where in this case, the relay terminal is the second relay terminal in the figure), performing steps 1801 and 1802 in FIG. 18 (where in this case, the relay terminal is the first relay terminal in the figure), performing steps 1801 to 1803, 1805 to 1807, and 1809 in FIG. 19 (where in this case, the relay terminal is the first relay terminal in the figure), performing steps 1801, 1801-A, 1802, 1803, 1805 to 1807, and 1809 in FIG. 20 (where in this case, the relay terminal is the first relay terminal in the figure), performing steps 2301 and 2302 in FIG. 23, performing steps 2501 and 2502 in FIG. 25, performing step 2702 in FIG. 27, and/or actions performed by the relay terminal in another process described in embodiments of this application. The processor 2901 may communicate with another network entity through the communication interface 2903, for example, communicate with the remote terminal shown in FIG. 10. The memory 2904 is configured to store program code and data of the relay terminal.

When the schematic structural diagram shown in FIG. 29 shows the structure of the remote terminal in the foregoing embodiments, the processor 2901 is configured to control and manage actions of the remote terminal. For example, the processor 2901 is configured to support the remote terminal in performing steps 607 to 609 in FIG. 7, performing steps 607 to 609 in FIG. 8, performing steps 903, 904, and 907 to 910 in FIG. 10, performing steps 903, 904, and 907 to 910 in FIG. 11, performing steps 1401 to 1403 in FIG. 14, performing steps 1503 to 1506 in FIG. 16, performing steps 1503 to 1506 in FIG. 17, performing steps 1803, 1804, and 1807 to 1810 in FIG. 19, performing steps 1803, 1804, and 1807 to 1810 in FIG. 20, performing steps 2101 to 2103 in FIG. 21, performing steps 2302 and 2303 in FIG. 23, performing steps 2501 and 2502 in FIG. 25, and performing steps 2701 and 2702 in FIG. 27, and/or actions performed by the remote terminal in another process described in embodiments of this application. The processor 2901 may communicate with another network entity through the communication interface 2903, for example, communicate with the first relay terminal shown in FIG. 10. The memory 2904 is configured to store program code and data of the remote terminal.

When the schematic structural diagram shown in FIG. 29 shows the structure of the access network device in the foregoing embodiments, the processor 2901 is configured to control and manage actions of the access network device. For example, the processor 2901 is configured to support the access network device in performing steps 605, 606, 604, and 607 in FIG. 7 (where in this case, the access network device is the second access network device in the figure), performing steps 604 to 606 in FIG. 8 (where in this case, the access network device is the second access network device in the figure), performing step 906 in FIG. 10 (where in this case, the access network device is the second access network device in the figure), performing step 906 in FIG. 11 (where in this case, the access network device is the second access network device in the figure), performing step 1302 in FIG. 13, performing step 1506 in FIG. 16 (where in this case, the access network device is the third access network device in the figure), performing step 1506 in FIG. 17 (where in this case, the access network device is the third access network device in the figure), performing step 1806 in FIG. 19 (where in this case, the access network device is the second access network device in the figure), performing step 1806 in FIG. 20 (where in this case, the access network device is the second access network device in the figure), performing steps 2303 and 2304 in FIG. 23, performing steps 2502 and 2503 in FIG. 25, performing steps 2702 and 2703 in FIG. 27, and/or actions performed by the access network device in another process described in embodiments of this application. The processor 2901 may communicate with another network entity through the communication interface 2903, for example, communicate with the first relay terminal shown in FIG. 10. The memory 2904 is configured to store program code and data of the access network device.

The foregoing communication unit or communication interface may be an interface circuit or a communication interface in the apparatus for receiving a signal from another apparatus. For example, when the apparatus is implemented as a chip, the communication unit or communication interface is an interface circuit or a communication interface in the chip for receiving a signal from or sending a signal to another chip or apparatus.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or the functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, SSD), or the like.

Optionally, an embodiment of this application further provides a computer-readable storage medium. The computer-readable storage medium stores computer instructions. When the computer-readable storage medium is run on a computer, the computer is enabled to perform the communication methods provided in embodiments of this application.

An embodiment of this application further provides a computer program product that includes computer instructions. When the computer program product runs on a computer, the computer is enabled to perform the communication methods provided in embodiments of this application.

An embodiment of this application further provides a chip. The chip includes a processor. When the processor executes instructions, the chip is enabled to perform the communication method provided in embodiments of this application.

All or some of foregoing embodiments may be implemented by software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedures or the functions according to embodiments of this application are partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
    detecting, by a relay terminal, that a link fault has occurred on a first link between the relay terminal and a remote terminal;
    sending, by the relay terminal, first notification information to an access network device, wherein the first notification information is for notifying the access network device that the link fault has occurred on the first link, and the first notification information comprises a destination identifier corresponding to a unicast connection between the relay terminal and the remote terminal.

2. The method according to claim 1, wherein the method further comprises:
    sending, by the relay terminal, second notification information to the remote terminal, wherein the second notification information is for notifying the remote terminal that the link fault has occurred on a link between the relay terminal and the access network device.

3. The method according to claim 2, wherein the second notification information comprises failure cause information that distinguishes that a cause of the link fault is a radio link failure (RLF).

4. The method according to claim 2, wherein the second notification information comprises failure cause information that distinguishes that a cause of the link fault is a configuration failure.

5. The method according to claim 1, wherein the method further comprises:
    releasing, by the relay terminal, the unicast connection to the remote terminal, wherein the unicast connection is not released until after receiving a response from a second core network device indicating that a user plane connection was released.

6. The method according to claim 1, further comprising:
    in response to the detecting, generating the first notification information for sending to the access network device.

7. The method according to claim 1, wherein the first notification information triggers the access network device to reconfigure the remote terminal or the relay terminal to switch a transmission path of a data packet of the remote terminal from a second path to a first path based on the first notification information.

8. The method according to claim 1, wherein the remote terminal is configured to communicate with the access network device through a first path and a second path, wherein the first path is a data transmission path used when the remote terminal directly communicates with the access network device, and the second path is a data transmission path used when the remote terminal communicates with the access network device using the relay terminal, wherein the second path is formed using the first link between the access network device and the relay terminal and a second link between the relay terminal and the remote terminal, wherein an identifier used when the remote terminal communicates with the access network device by using the first path is a first identifier and an identifier used when the remote terminal communicates with the access network device by using the second path is a second identifier and before sending the first notification information to the access network device or at a time of sending the first notification information to the access network device, the method further comprises:

sending, by the remote terminal, the second identifier to the access network device through the first path, wherein the second identifier triggers the access network device to determine, based on the second identifier, that a terminal corresponding to the first identifier and a terminal corresponding to the second identifier are a same terminal.

9. An apparatus, comprising:

at least one processor, and a memory storing instructions for execution by the at least one processor;

wherein, when executed, the instructions cause the apparatus to:

detect that a link fault has occurred on a first link between a relay terminal and a remote terminal; and send first notification information to an access network device, wherein the first notification information is for notifying the access network device that the link fault has occurred on the first link, and the first notification information comprises a destination identifier corresponding to a unicast connection between the relay terminal and the remote terminal.

10. The apparatus according to claim 9, wherein, when executed, the instructions cause the apparatus to:

send second notification information to the remote terminal, wherein the second notification information is for notifying the remote terminal that the link fault has occurred on a link between the relay terminal and the access network device.

11. The apparatus according to claim 10, wherein the second notification information comprises failure cause information that distinguishes that a cause of the link fault is a radio link failure (RLF).

12. The apparatus according to claim 10, wherein the second notification information comprises failure cause information that distinguishes that a cause of the link fault is a configuration failure.

13. The apparatus according to claim 9, wherein, when executed, the instructions cause the apparatus to:

release the unicast connection to the remote terminal, wherein the unicast connection is not released until after receiving a response from a second core network device indicating that a user plane connection was released.

14. The apparatus according to claim 9, wherein, when executed, the instructions cause the apparatus to, in response to the detecting, generate the first notification information for sending to the access network device.

15. An apparatus, comprising:

at least one processor, and a memory storing instructions for execution by the at least one processor;

wherein, when executed, the instructions cause the apparatus to:

receive second notification information from a relay terminal, wherein the second notification information is for notifying a remote terminal that a link fault has occurred on a link between the relay terminal and an access network device;

communicate with the access network device by using a first path and a second path, wherein the first path is a data transmission path used when the access network device performs direct communication with the remote terminal, and the second path is a data transmission path used when the remote terminal communicates with the access network device by using the relay terminal; and send the second notification information to the access network device through the first path, wherein the second notification information indicates a correspondence between a first identifier associated with a direct connection with the remote terminal and a second identifier associated with a unicast connection between the access network device and the relay terminal.

16. The apparatus according to claim 15, wherein, when executed, the instructions cause the apparatus to:

determine failure cause information that distinguishes that a cause of the link fault is a radio link failure (RLF), wherein the second notification information further comprises the failure cause information.

17. The apparatus according to claim 15, wherein, when executed, the instructions cause the apparatus to:

receive reconfiguration of the access network device, wherein the reconfiguration switches a transmission path of a data packet of the remote terminal from the second path to the first path.

18. The apparatus according to claim 15, wherein the second identifier triggers the access network device to determine, based on the second identifier, that a terminal corresponding to the first identifier and a terminal corresponding to the second identifier are a same terminal.

19. The apparatus according to claim 15, wherein, when executed, the instructions cause the apparatus to:

determine failure cause information that distinguishes that a cause of the link fault is a configuration failure, wherein the second notification information further comprises the failure cause information.

* * * * *